(12) United States Patent
Huang et al.

(10) Patent No.: US 6,399,937 B1
(45) Date of Patent: Jun. 4, 2002

(54) COMPUTER BASED SEMI-AUTOMATIC FOCUSING AND ASSEMBLY APPARATUS AND METHOD

(75) Inventors: Peisen S. Huang, Coram; Imin Kao, Stony Brook, both of NY (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 09/601,822

(22) Filed: Aug. 8, 2000

Related U.S. Application Data
(60) Provisional application No. 60/074,455, filed on Feb. 12, 1998.

(51) Int. Cl.[7] .............................. H01J 3/14; G02B 27/40
(52) U.S. Cl. .................... 250/216; 250/201.2; 356/400; 362/277
(58) Field of Search .......................... 250/201.2, 201.4, 250/216; 362/235, 240, 277, 317, 319; 356/400

(56) References Cited

U.S. PATENT DOCUMENTS
5,032,960 A * 7/1991 Katoh ........................ 362/240
5,523,591 A * 6/1996 Fleming et al. ............... 257/91

* cited by examiner

*Primary Examiner*—Stephone Allen
(74) *Attorney, Agent, or Firm*—Hoffmann & Baron, LLP

(57) ABSTRACT

An apparatus and method for semi-automatic focusing and assembling of a light beam modifier, such as a lens, relative to a light beam source to optimize the light beam characteristics at one or more locations along the beam path using one or more light beam analyzers (27, 28, 29). A host computer compares the measurements and axially adjusts the light beam modifier. The apparatus may include two focusing stations (21, 22) for alternately focusing and assembling two light source assemblies, two beam splitters (25, 26) for splitting the light beam emitted from either focusing station into three components, and three light beam analyzers for measuring the beam characteristics at three locations. The apparatus may also include a video camera for automated or manual pointing of the laser beam, a semi-automatic glue dispensing system for fixing the light beam modifier relative to the light source and an automatic laser power-up circuit.

35 Claims, 18 Drawing Sheets

COMPUTER BASED SEMI-AUTOMATIC FOCUSING AND ASSEMBLY APPARATUS AND METHOD

CROSS-REFERENCE TO RELATED APPLICATIONS

This application claims the benefit of U.S. Provisional Application No. 60/074,455, filed Feb. 12, 1998.

COPYRIGHT NOTICE

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

FIELD OF THE INVENTION

The present invention relates to optical focusing systems and more particularly relates to a computer-based semi-automatic focusing and assembly apparatus and method for focusing and assembling optical devices, such as laser diode assemblies, used in bar-code scanning systems.

BACKGROUND OF THE INVENTION

Bar-code scanning systems are widely used in retailing, postal and parcel delivery services, manufacturing, warehousing and distribution and other industries for fast data transaction applications. The benefits of such scanning systems are countless. For example, in manufacturing, the use of bar code scanners could result in accurate raw material inventory, production routing, work-in-progress tracking, labor efficiency, inventory control, quality assurance, shipping precision, and so on.

One of the key elements of bar-code scanners is the laser diode assembly that provides the light source for the scanners. The focusing characteristics of the assembly have significant effects on the correct reading of bar codes. If the laser beam emitted from the laser diode assembly is not focused accurately, it will result in a weak signal level and therefore possible loss of information when it scans across the bar-code. The end result is that one has to scan several times before correct information can be captured. For bar-code scanners to be effective over a range of distances, the beam width of the laser beam has to be within tolerance at several specified distances (normally three distances corresponding to the near, mid and far fields are specified). To ensure that the beam width requirement is met and therefore high scanner accuracy is achieved, every laser diode assembly needs to be focused in high precision during production.

Currently such focusing adjustments are performed manually in most of the bar-code scanner production processes which limits productivity as well as focusing performance of the laser diode assemblies. The manual focusing setup typically used in manufacturing laser diode (LD) assemblies consists of the following components: the laser diode assembly consisting of a light beam emitting laser diode, a focusing lens, a lens holder with an aperture, a spring, and a diode holder; a mechanical fixture to hold the LD assembly; a beam scan head including a cylindrical rotating drum with a slit for beam width measurement, a photo detector for beam power measurement, and a level for gain adjustment; a guide rail to move the scan head for beam width measurement at different distances (the height of the scan head can also be adjusted); a beam scan block which controls the scan head and displays the beam width (the outputs of the scan block include an analog beam profile signal, a trigger signal, and a clock reference signal); a current source that supplies the current to the laser diode; and a laser power meter which is used to measure the intensity of a laser beam during the laser diode power-up stage.

The first step of the focusing process is to assemble the laser diode, the spring, and the lens together in the diode holder and use a clamp to hold the parts in place. Next, this assembly is placed in the mechanical focusing fixture. The clamp is lifted and the assembly is now ready for focusing. For each type of assembly, the operator is usually given three specified locations at which the beam width should be focused (i.e., near, mid and far fields). The operator's next task is to connect the current source to the laser diode and slowly increase the current to a specified value. The operator then manually slides the scan head to the nearest specified location and adjusts the orientation of the LD so that the beam is centered in the aperture of the scan head. The operator then adjusts one or more focusing knobs of the focusing fixture so that the beam width displayed on the scan head is within a specified tolerance. The process is then repeated at mid and far field locations. If the operator is successful in achieving beam widths within the specified tolerances at all locations, glue is carefully applied to the lens holder to fix the lens with respect to the LD. After the curing time of the glue has elapsed, the operator removes the assembly and starts focusing the next assembly. If the operator is not able to focus the beam to acceptable beam widths at all locations, the assembly is rejected.

Following are some of the major problems associated with the manual focusing setup and procedures:

Moving Scan Head

One of the major concerns of the current setup is that the operator has to repeatedly move the scan head on the rail back and forth during focusing. For mass production, the time spent on moving the beam scan head significantly reduces productivity.

Time Consuming Focusing Check After Curing

After curing, the beam widths at specified distances have to be checked again to see if they are still within tolerances. To do this in the existing manual setup, the operator has to move the scan head to different locations again, which further slows down the process.

Human Factor

In the existing setup, the focusing criteria is quite subjective with the operator making most of the decisions based on intuition and experience. In addition, the operator is not required to optimize focusing.

Wasted Time During Curing

Currently, the operator focuses only one LD assembly at a time. During the curing period, the operator is basically idle. This period of time can be utilized more efficiently if the operator can start focusing the next assembly. With the current setup this is not possible.

No Check on Beam Centering

Another concern is that the operator cannot accurately point the laser beam to the center of the scan head aperture due to the lack of an accurate beam centering target. Because of this pointing error, the beam width displayed on the scan block may not be an accurate indication of the true beam width at the specified clip level.

Focusing Inconsistency

Currently, the operator's task is simply to bring the beam widths within the specified tolerances. No targeting of specific beam width values within the specified ranges is required. The result of this practice is that the assembled LD assemblies lack focusing consistency from assembly to assembly, which in turn may result in performance inconsistency of bar-code scanner products.

Lack of Process Tracking

During the focusing process, some of the focusing parameters may change systematically due to errors in the focusing setup or systematic defects in the laser diodes and focusing lenses. Since no focusing data are recorded in the current focusing process, no process tracking can be done to detect such problems. Also, if a laser diode assembly results in a defective product when assembled into a bar-code scanner, no trouble shooting can be done because no data regarding to the focusing condition of the laser diode assembly at the time of assembling is available.

No Control Over the Amount of Glue Dispensed

After focusing, the amount of glue applied for curing and the way how glue is applied are crucial. The operator has to be very careful in making sure that no excessive amount of glue is applied. If this operation is not carried out with care, then the focal distance may change and the focusing may go out of tolerance. In the currently process, there is no control over the amount of glue dispensed, which could cause serious problems if the operator is not careful or not skillful.

No Access to Beam Profile Information

Another concern is that the engineers do not have easy access to the beam profile information at different distances, especially that for the assembled laser diode assemblies, to perform a comprehensive analysis of the process. The beam profiles together with beam widths can provide a more complete and in-depth knowledge about the nature of the laser beam.

Manual Power-up Procedure

The current procedure of powering up the LD is completely manual. The operator is given a target laser power level and a corresponding range of current values. The operator is supposed to manually adjust the current supply until the specified laser power level is reached. There is no specification nor control over the speed at which the operator should follow to power-up the LD. The major concern here is that rapid power-up and excessive current supply may result in permanent damage to the LD. Another concern is that there is no continuous monitoring of the laser power in the current focusing process. Therefore, if the laser power is changed, it cannot be detected and erroneous focusing may thus result.

Accordingly, it is an object of the present invention to overcome such shortcomings and to provide an improved method and apparatus for focusing and assembling visible laser diode devices.

SUMMARY OF THE INVENTION

The present invention is an apparatus and method for semi-automatic focusing and assembling of a light beam modifier, such as an optical lens, relative to a light beam source, such as a laser diode, to optimize the light source's beam characteristics at one or more desired locations along the path of the beam. The present invention utilizes one or more light beam analyzers positioned at one or more desired locations along the path of the beam to measure a beam characteristic, such as beam width, and to generate value signals based on these measurements. The value signals are sent to a host computer for comparison with predetermined optimal beam parameter ranges. The computer generates a focusing signal, based on the comparison, which is used to axially adjust the light beam modifier relative to the light source.

Preferably, the light beam modifier and light source are held in axial alignment in a focusing fixture which is adjustable for pointing the light beam in a desired direction and for focusing the beam. The focusing station includes a stepper motor electrically connected to the host computer for receiving the focusing signal and axially adjusting the light beam modifier based on this signal. The focusing station is mounted at a fixed position on a carrier rail arrangement. The one or more light beam analyzers are slidably mounted on the carrier rail arrangement for positioning the analyzers at desired locations.

In a preferred embodiment, the present invention includes two focusing stations, three light beam analyzers and two beam splitters mounted on a perpendicular carrier rail arrangement. The two focusing stations are mounted perpendicularly and equidistant from a first beam splitter. The first beam splitter splits the light beam emitted from either focusing stations into two components. The first component is directed to a first light beam analyzer positioned at a desired location and the second component is directed to a second beam splitter. The second beam splitter further splits from the second light beam component a third component. The second and third light beam components are respectively measured by a second and a third light beam analyzer positioned on the rails at desired locations.

The spatial arrangement of the focusing stations, two beam splitters and three light beam analyzers upon carrier rails in itself allows for simultaneous measuring of beam characteristics at three locations and for alternately focusing and assembling two laser diode assemblies without the aid of a host computer. Preferably, however, the three light beam analyzers generate value signals based on their respective beam measurements and send these signals to a host computer. The host computer receives these signals and compares them to predetermined parameter ranges associated with the selected locations along the beam path. The host computer generates a focusing signal based on an optimization algorithm for the three locations and sends the focusing signal to the stepper motors for axially adjusting the light beam modifiers with respect to the light beam sources.

To provide easy pointing of the laser beam emitted from either focusing station, the present invention also preferably includes a video camera electrically connected to the host computer and facing one of the scan heads. The video camera provides a live image of the laser spot on a computer screen along with a reference target. Pointing of the laser beam is done either by manually adjusting the pointing mechanisms of the focusing stations or automatically through the use of a data acquisition system of the computer. For automatic pointing, the computer preferably includes a video frame grabber which digitizes the laser beam image captured by the video camera and detects its location on a scan head. Again, an algorithm which can be provided by computer software or other signal generating means, e.g., analog and/or digital circuitry (printed or otherwise), generates an adjustment signal based on the difference between the detected beam location and the known center of the scan head. The adjustment signal is sent to additional adjustment motors which activate the pointing mechanisms of the focusing fixture to center the beam on the scan head.

The apparatus also preferably includes a semi-automatic glue dispensing system. A valve-controlled glue dispensing system with a custom-made glue dispensing gun is used. When the operator presses a switch on the glue dispensing gun, a well-controlled amount of glue is dispensed to fix the light beam modifier relative to the light source. Once this is done, a signal is sent to the computer via the data acquisition system which initiates a curing timer to count down. The timer alerts the operator when the proper curing time has elapsed.

In another preferred embodiment of the present invention, the apparatus includes automatic laser power-up circuitry. The computer first powers up the light source to a pre-focusing current level for pointing purposes. After pointing, the circuitry then powers the light source to the nominal power level. The power level is monitored continuously and the laser power is displayed on the computer screen.

In a method for optimizing characteristics of a light beam emitted from a light source at one or more locations along the path of the light beam according to the present invention, a light beam modifier is axially aligned with a light beam source and the beam emitted from the source is continuously measured at one or more selected locations along the path of the beam. Value signals corresponding to these measurements are generated and are compared with predetermined parameter ranges. A focusing signal based on the comparison is generated and is sent to the light beam modifier for axially adjusting the modifier with respect to the light source. The focusing signal terminates when the value signals fall within the predetermined parameter ranges and the light beam modifier is fixed relative to the light source. In a preferred method, two beam splitters are positioned along the path of the light beam to split the beam into three components which, in turn, are continuously measured at three selected locations.

As a result of the present invention, a method and apparatus is provided for semi-automatic focusing and assembling of laser diode assemblies is provided. The benefits of which are the reduction of the time needed to focus a laser diode assembly, the reduction of moving parts in the system as well as the overall improvement of quality. With the present invention, beam profiles along with other important focusing data are automatically saved to data files. These data files provide optical engineers with an extensive database of information for detailed analysis of the focusing process.

For a better understanding of the present invention, reference is made to the following detailed description to be taken in conjunction with the accompanying drawings and its scope will be defined in the appended claims.

DETAILED DESCRIPTION OF THE PREFERRED EMBODIMENTS

The present invention is a computer-based, semi-automatic focusing and assembly system utilizing beam splitters to simultaneously focus a light beam emitted from a light source at three focusing distances. It therefore provides a universal focusing and assembly setup which is easily set up to focus and assemble different laser diode assemblies. Beam measurement scan heads are mounted on carriers that slide on guide rails so that all standard LD assemblies can be accommodated. The system includes a host computer with a Data Acquisition System (DAS) for interfacing the scan blocks with the computer. Two focusing stations are also provided to increase the efficiency and productivity of the focusing and assembly process. When one station enters the curing period, the operator can start focusing another LD assembly in the other station. In this way, the waiting time during the curing stage is eliminated. The focusing stations include computer-controlled automatic focusing stepper motors and appropriate translation stages with micro-stepping capability to meet the high accuracy requirement of the focusing process. Computer software enables operators to focus and assemble various LD assemblies and allows engineers to analyze beam characteristics, change focusing parameters, and retrieve focusing data of previously focused diodes.

Figure 1:
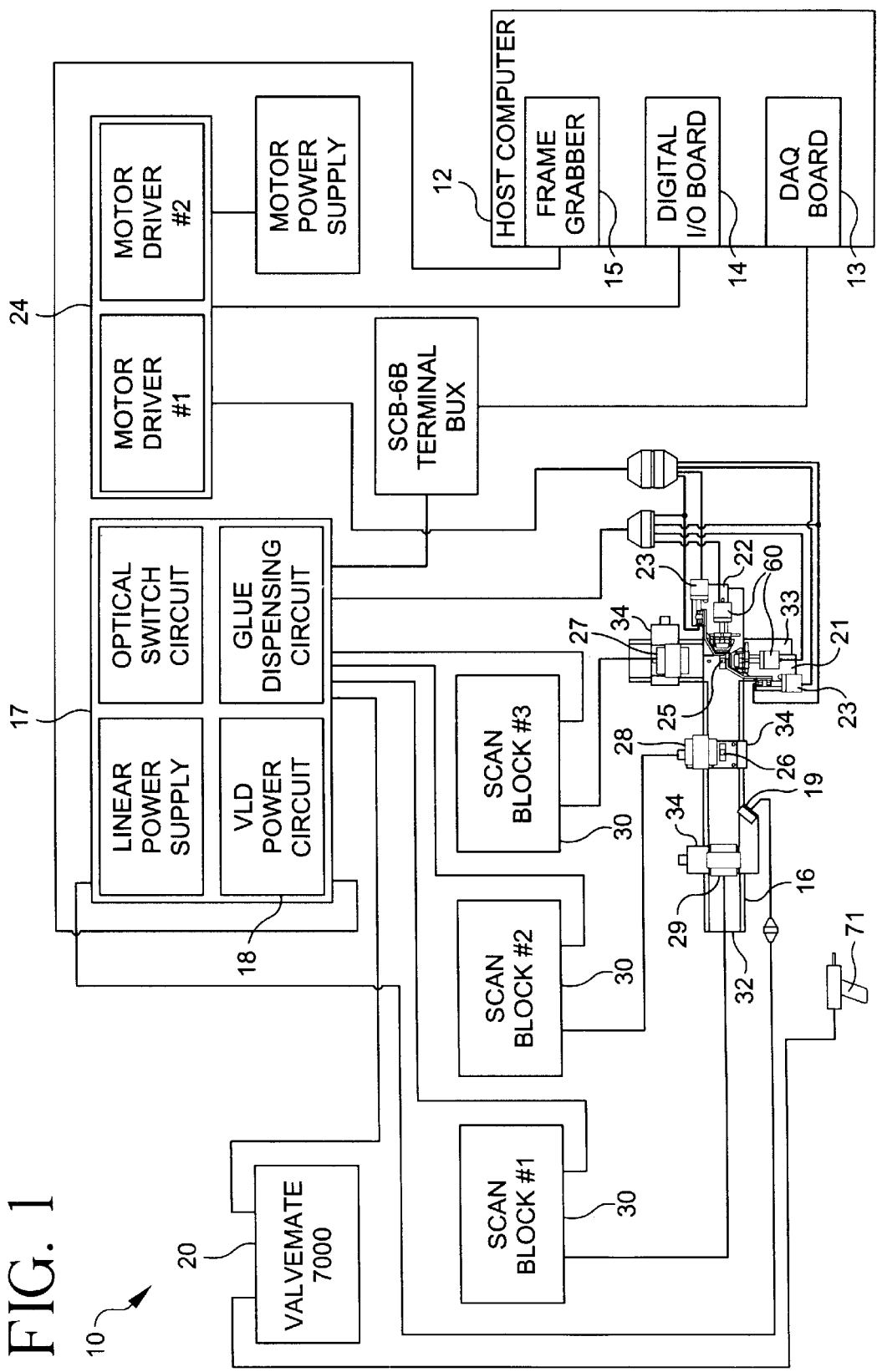
FIG. 1 is a schematic diagram of a computer based semi-automatic focusing and assembly apparatus formed in accordance with the present invention.

FIG. 1 is a schematic diagram of the new focusing system 10. It generally includes the following major components: 1) a host computer (PC) 12 having a data acquisition system 13, a digital I/O board 14, and a frame grabber video card 15; 2) a mechanical setup 16; 3) an electrical control box 17 including a laser power-up circuit 18; 4) a CCD video camera 19; and 5) a glue dispensing system 20.

Figure 2:
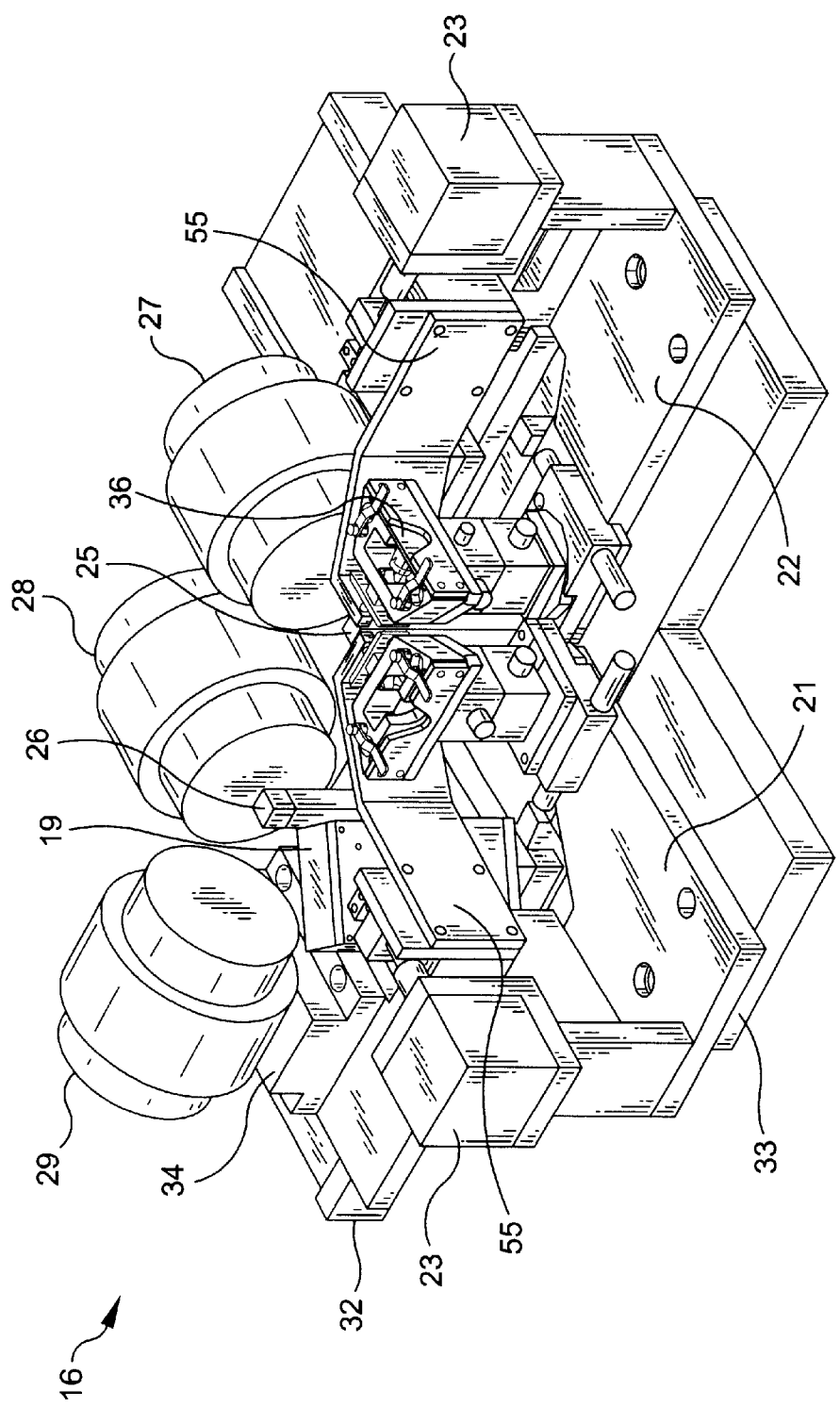
FIG. 2 is a perspective view of the mechanical setup of the present invention.
Figure 3:
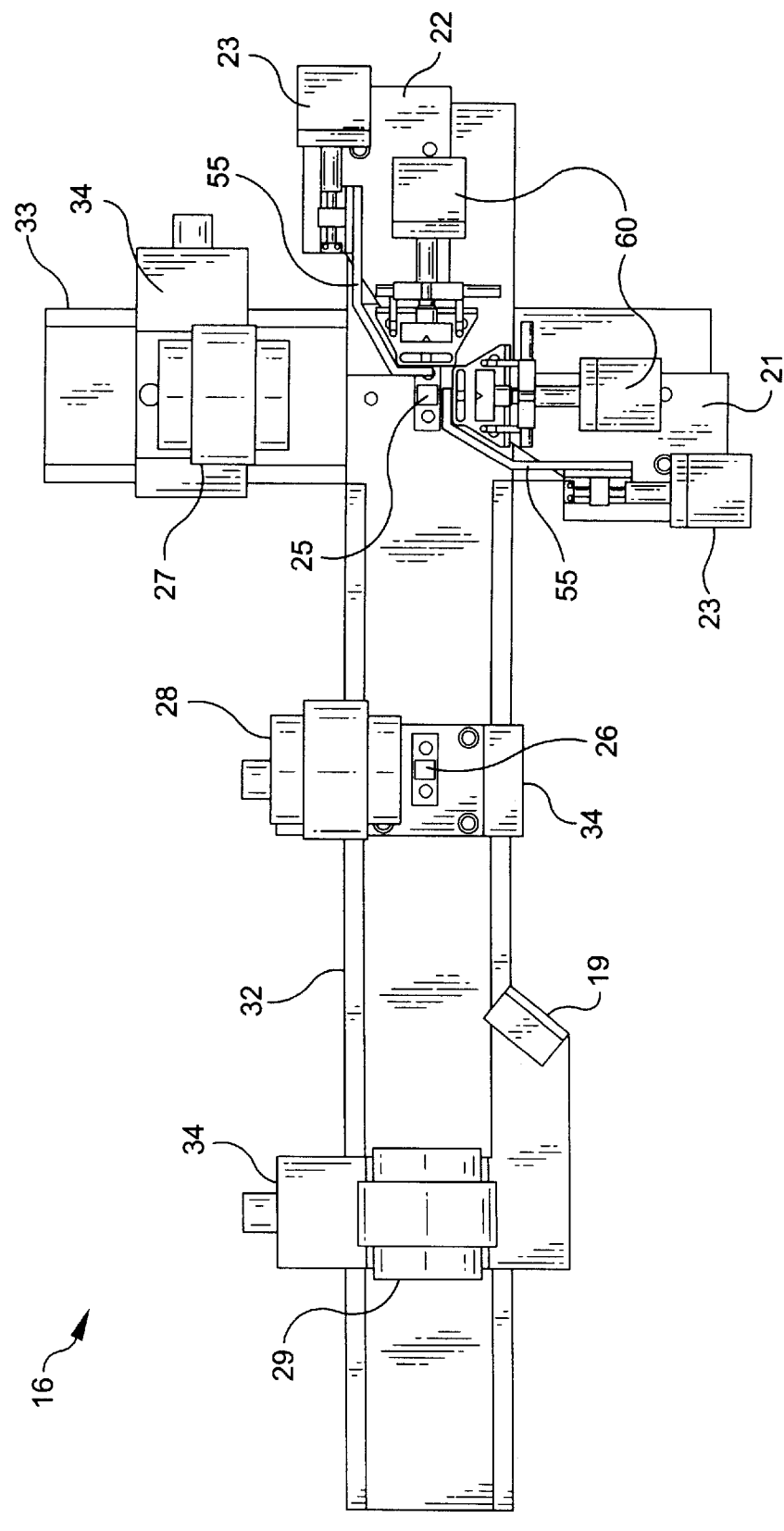
FIG. 3 is a top plan view of the mechanical setup shown in FIG. 2, but including pointing stepper motors.

Referring additionally to FIGS. 2 and 3, the mechanical setup 16 preferably includes: two focusing stations 21 and 22, each having a stepper motor 23 electrically connected to a corresponding driver 24; two beam splitters 25 and 26; and three beam scan heads 27, 28 and 29 with corresponding scan blocks 30. All of the components are mounted on two mutually orthogonal intersecting rails, a longitudinal rail 32 and a cross rail 33. Briefly, the two beam splitters 25 and 26 split a laser beam emitted from either of the focusing stations into three beam components, each being directed to a near-, mid-, and far-field scan head 27, 28 and 29, respectively. The three scan heads 27, 28 and 29, each fixed upon a respective carrier 34, measure the characteristics of the laser beam components at three predetermined distances (e.g., for a standard LD model, the shortest focusing distances are 75 mm for the near-field, 140 mm for the mid-field, and 175 mm for the far-field). The scan heads utilized in the present invention measure beam width, however, different scan heads for measuring other beam characteristics may be utilized. The positions of the scan head carriers 34 on the rails 32 and 33, and therefore the focusing distances, can be easily adjusted to accommodate different laser diode assemblies. Three scales (not shown), each for one field, may be fixed on top of the rails to indicate the focusing distances in the near-, mid-, and far-field respectively.

In this regard, the mechanical setup 16 is universal in that it can be used to focus many different laser diode assemblies. The setup is designed primarily for typical LD assemblies used in standard bar-code scanners, however, the setup can be easily adapted to other LD assemblies used in long range scanners by attaching additional rails to the existing ones. Furthermore, although reference is made herein primarily to laser diode assemblies having an optical focusing lens for optimizing laser beam width, the present invention is easily adapted for positioning any conceivable light modifying device relative to a light source. What is meant by a light modifying device is any device capable of altering a characteristic or changing the direction of a light beam passing therethrough. The present invention is designed to position such a light modifying device relative to a light source in order to optimize any desired light beam characteristic at one or more selected locations along the beam path.

Figure 4:
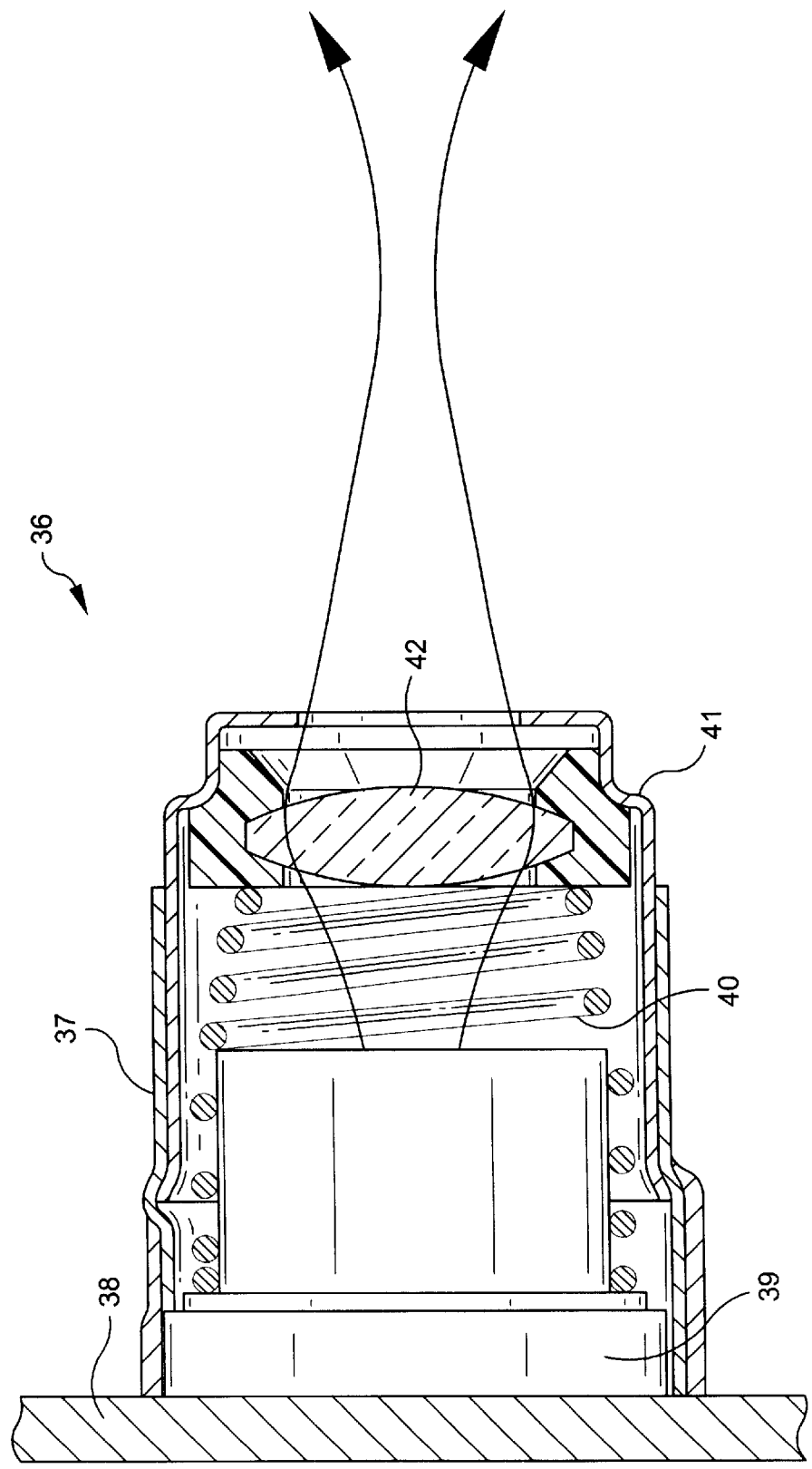
FIG. 4 is a cross-sectional view of a laser diode assembly.
Figure 5:
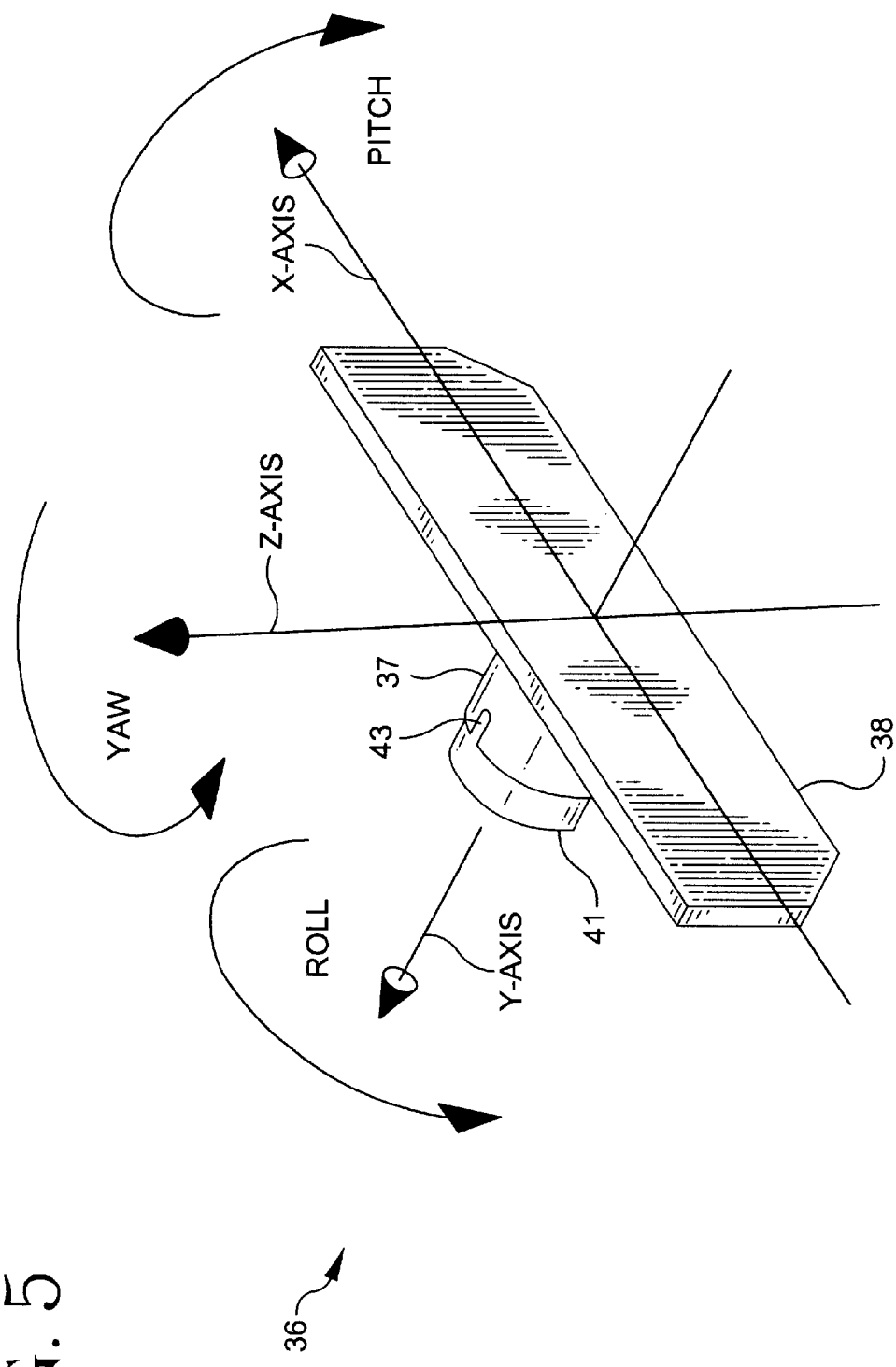
FIG. 5 is a perspective view of the laser diode assembly shown in FIG. 4.

Referring briefly to FIGS. 4 and 5, a typical laser diode (LD) assembly 36 is shown. A typical LD assembly as that shown in FIG. 3 is disclosed in U.S. Pat. No. 4,923,281 to Krichever et al. It includes an outer LD housing 37 having a mounting plate 38 for subsequent mounting within a bar-code scanner assembly. Fixed within the housing 37 is the laser diode 39 and a coil spring 40. The LD assembly 36 also includes a lens housing 41 containing a lens 42. The lens housing 41 is biased against the spring 40 and axially translates within the LD housing 37, for optically focusing the lens 42 with respect to the laser diode 39. Once the correct position of the lens 42 is set, the lens housing 41 and the LD housing 37 are typically glued together at one or more notches 43 of the LD housing to fix the lens relative to the laser diode 39.

An important factor that determines the focusing time of the LD assembly is the number of steps involved in the focusing procedure. The current manual process requires each assembly to be mounted on a special fixture before being loaded into a focusing nest. The new design permits the assembly to be loaded into a nest directly without using any assisting mechanism, thus reducing focusing time and improving productivity. To make the system truly universal, the nests are also designed to be removable and interchangeable with other nests designed and made for other LD assemblies.

Figure 6:
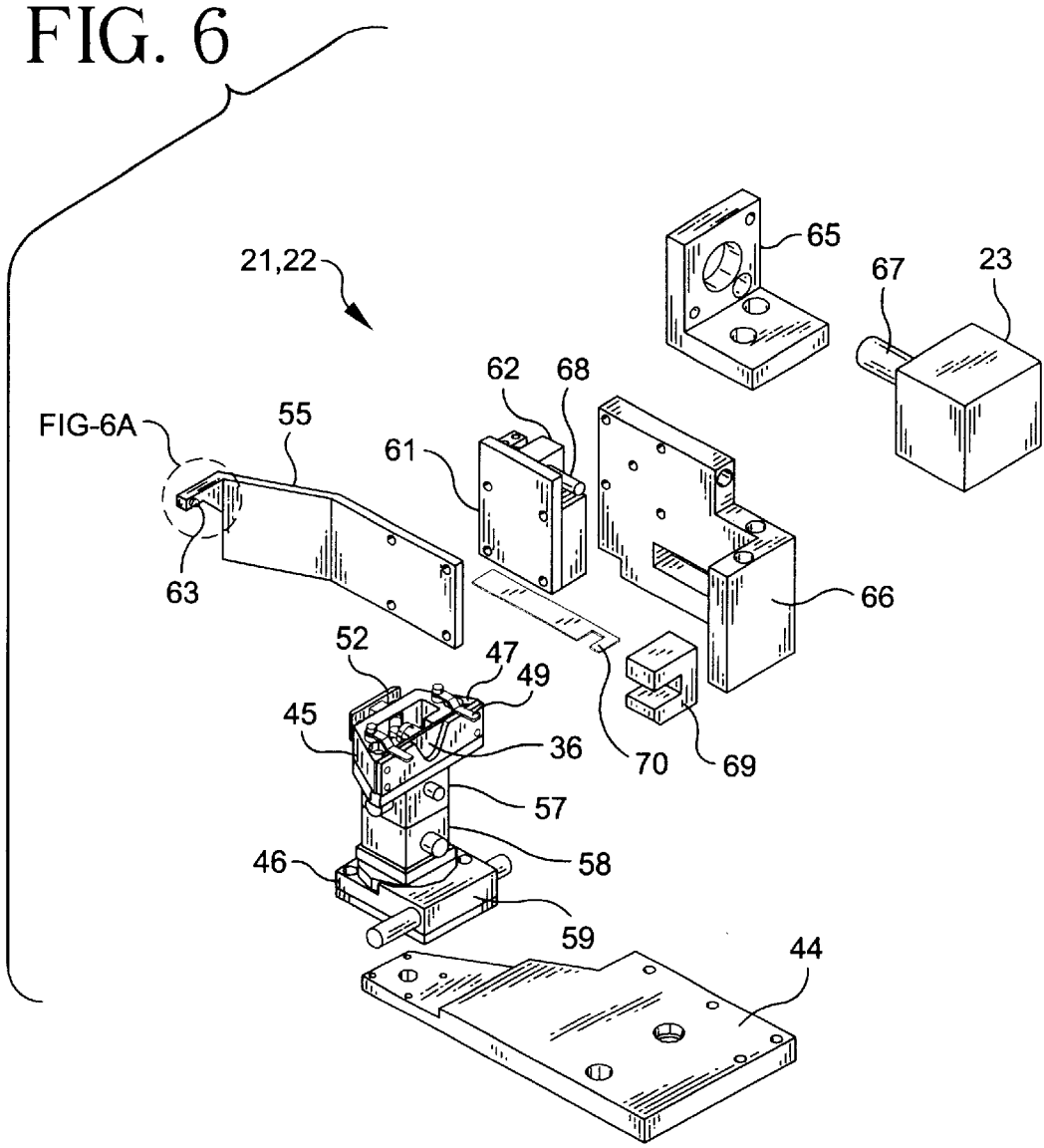
FIG. 6 is an exploded perspective view of one of the focusing stations.
Figure 6A:
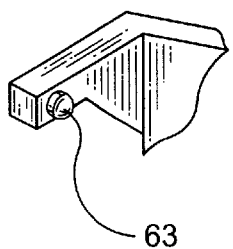
Figure 7:
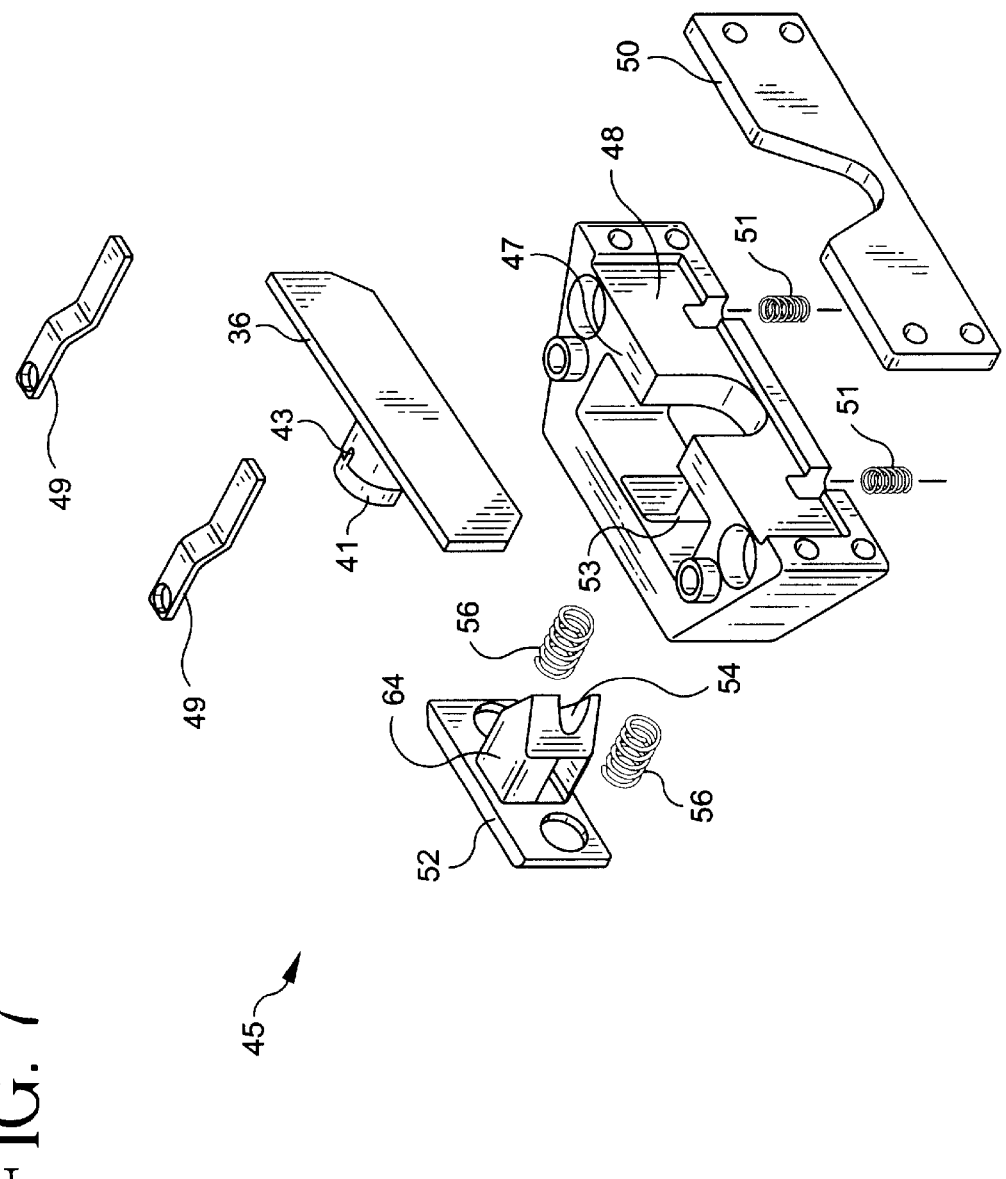
FIG. 7 is an exploded perspective view showing the nest of the focusing station illustrated in FIG. 6.

Referring now to FIGS. 6 and 7, each focusing station 21 and 22 has two major parts mounted on the same base plate 44: the LD assembly mounting and focusing part 45, and the pointing part 46. The mounting and focusing part 45 is for clamping the LD assembly during the focusing procedure and for focusing adjustments. The pointing part 46 is for pointing adjustments, both manually and automatically.

The mounting and focusing part 45 includes a nest 47 which accommodates the LD assembly 36. The loose LD assembly 36 is loaded from the top into a slot 48 formed in the nest 47 and is held in place by two clamping springs 49 and a retainer plate 50 which are mounted to the nest. A clearance fit permits the diode assembly to be mounted and dismounted easily. At the bottom of the slot 48 there are two eject springs 51 that are used to eject the LD assembly 36 when the clamping springs 49 are released. The nest 47 is preferably made from a stainless steel for increased durability and wear resistance.

The nest 47 also includes a plunger 52 which slides in and out of a front opening 53 of the nest. The plunger contacts the outer rim of the lens housing 41 and includes a through hole 54 for allowing the laser beam emitted from the diode 39 to pass through. The plunger 52 is held within the nest by a focusing lever arm 55. Two spiral springs 56 mounted on both sides of the plunger 52 are provided for biasing the plunger outwardly against the lever arm 55. When the LD assembly 36 is mounted within the nest 47, the internal spring 40 of the LD assembly biases the lens housing 41 against the plunger 52. Movement of the plunger 52, and thus axial translation of the lens housing 41, will be discussed in further detail below.

Once the LD assembly 36 is mounted within the nest 47, the laser beam emitted from the diode 39 must be accurately pointed. Returning briefly to FIG. 5, the required number of degree-of-freedoms (DOF's) for pointing the LD assembly 36 is three: one rotation about the axis vertical to the ground (Z-axis); one rotation about the horizontal axis parallel to the direction of the beam (Y-axis); and finally one rotation about the horizontal axis perpendicular to the plane formed by the Y and Z axes (X-axis). For simplicity, the names yaw, roll, and pitch will be used to describe the three rotations respectively. Basically, yaw and pitch are necessary for the pointing adjustments of the laser beam and roll is necessary for the optimization of the laser spot. In order not to increase the number of required DOF's during pointing, it is important to perform the three necessary rotations without translation. Otherwise, additional DOF's will be needed to compensate for the errors introduced by the translations.

To accomplish this, the focusing stations 21 and 22 include pointing parts 46 which use pointing stages in which all three rotations are performed about the same point located at the intersection point of the three rotational axes. The pointing stages consist of two stackable goniometers 57 (upper) and 58 (lower) and one rotational stage 59 as shown in FIG. 6. The rotational stage 59 is mounted with its axis of rotation vertical along the Z-axis. It preferably has a coarse rotation of 360° and a precision fine adjustment of ±5° with a resolution of 5 arcmin. The two goniometers 57 and 58 are designed to be stacked as a pair. Their different rotational radii are matched to produce motion about the point where the two rotational axes are intersected. Both goniometers 57 and 58 are driven by geared knobs, providing a resolution of 0.1°–0.2°. The two goniometers 57 and 58 are used to provide pitch and roll motions and the rotational stage 59 is used to provide yaw motion. The high positioning resolution in conjunction with the ability to provide pure spherical motion enables the system to point the laser beam easily and accurately. Acceptable goniometers 57 and 58 and rotational stages 59 are: Models Stackable Goniometer 07GOH507 (upper); Stackable Goniometer 07GOH508 (lower); and Rotation Stage 07TRT504, all supplied by Melles Griot.

As mentioned above, preferably two focusing stations 21 and 22 are used to focus and glue LD assemblies simultaneously. The two stations 21 and 22 are mounted to the top surfaces of the two intersecting rails 32 and 33 close to their intersection, one on each rail. Station #1 21 is fixed on the cross rail 33 facing the near-field scan head 27 and Station #2 22 is fixed on the longitudinal rail 32 facing the far-field scan head 29. The two stations are in mirror symmetry of each other with their optical axes perpendicular to each other. The optical axes intersect at the center of the first beam splitter 25, placed equidistantly from both stations as shown in FIGS. 2 and 3. When a laser beam from either station passes through the first beam splitter 25, it splits into two beams, one traversing towards the near-field scan head 27 and the other towards the second beam splitter 26. The beam traversing toward the second beam splitter 26 further splits into two components, one towards the mid-field scan head 28 and the other towards the far-field scan head 29. Both beam splitters 25 and 26 are mounted on top of posts and aligned in such a way that, when the goniometers 57 and 58 and rotational stages 59 are properly adjusted, the beam is centered on the three scan heads simultaneously. The first beam splitter 25 is fixed so that its relative position to the stations 21 and 22 remains the same regardless of LD assemblies and focusing distances. The second beam splitter 26, on the other hand, is mounted on a carrier 34 which moves together with the mid-field scan head 28. As mentioned above, the mid-field focusing distance is adjusted by sliding the carrier 34 along with the mid-field scan head 28 along the longitudinal rail 32.

The present invention utilizes cube beam splitters consisting of matched pairs of identical right angled prisms. A preferred cube beam splitter is Model No. 03BSC003 supplied by Melles Griot. As the laser beam passes through each of these beam splitters, 45% of the beam power is reflected, 45% is transmitted and 10% is absorbed so that each scan head receives a portion of the total laser intensity in accordance with the splitting ratio of the beam splitter. This means that the first (near-field location) scan head 27 receives 45% of the total power while the other two scan heads 28 and 29 receive only 20.25% each. To balance the signal levels, the gain of each scan head must be adjusted accordingly.

Still referring to FIGS. 1, 2 and 3, a CCD video camera 19 is used in the present invention to assist the pointing of the laser beam upon the scan heads 27, 28 and 29. A suitable CCD camera is Model No:7259L manufactured by Panasonic. The CCD video camera 19 is shown mounted on the far-field carrier 34 at a fixed distance from the far-field scan head 29, however, the camera 19 may be positioned adjacent any of the three scan heads so long as it faces the scan head at an angle of about 40°. This angle was chosen to provide a balanced view of the laser beam on the scan head and to avoid the possibility of the laser beam being blocked by the camera. The camera 19 captures the live image of the laser spot within its field of view and displays it on a computer video screen. The computer video screen also includes a reference target representing the true center of the beam scan head. The operator can easily bring the spot to the center of the scan head aperture by manually adjusting the knobs of the rotational stage 59 and the goniometers 57 and 58 while looking at the reference target on the computer screen.

The system according to the present invention may employ a manual pointing procedure, as described above, or an automatic pointing process for focusing the LD assemblies. For automatic pointing, the host computer includes an image processing algorithm which detects the location of the laser beam spot captured by the CCD video camera 19 and sends an adjustment signal to additional pointing stepper motors 60 for adjusting the rotational stage 59 and the goniometers 57 and 58 (see FIGS. 1 and 3). A one-time calibration process is required in which a laser beam from a pre-calibrated LD assembly is manually pointed at the center of a scan head aperture. The laser spot on the scan head is then analyzed to calculate the threshold image and to find the geometric centroid of the laser spot. This linear position calibration is then stored within the computer and serves as the reference target for all subsequent LD assemblies. The computer algorithm for automatic pointing of the laser beam is discussed in further detail below.

Figure 8:
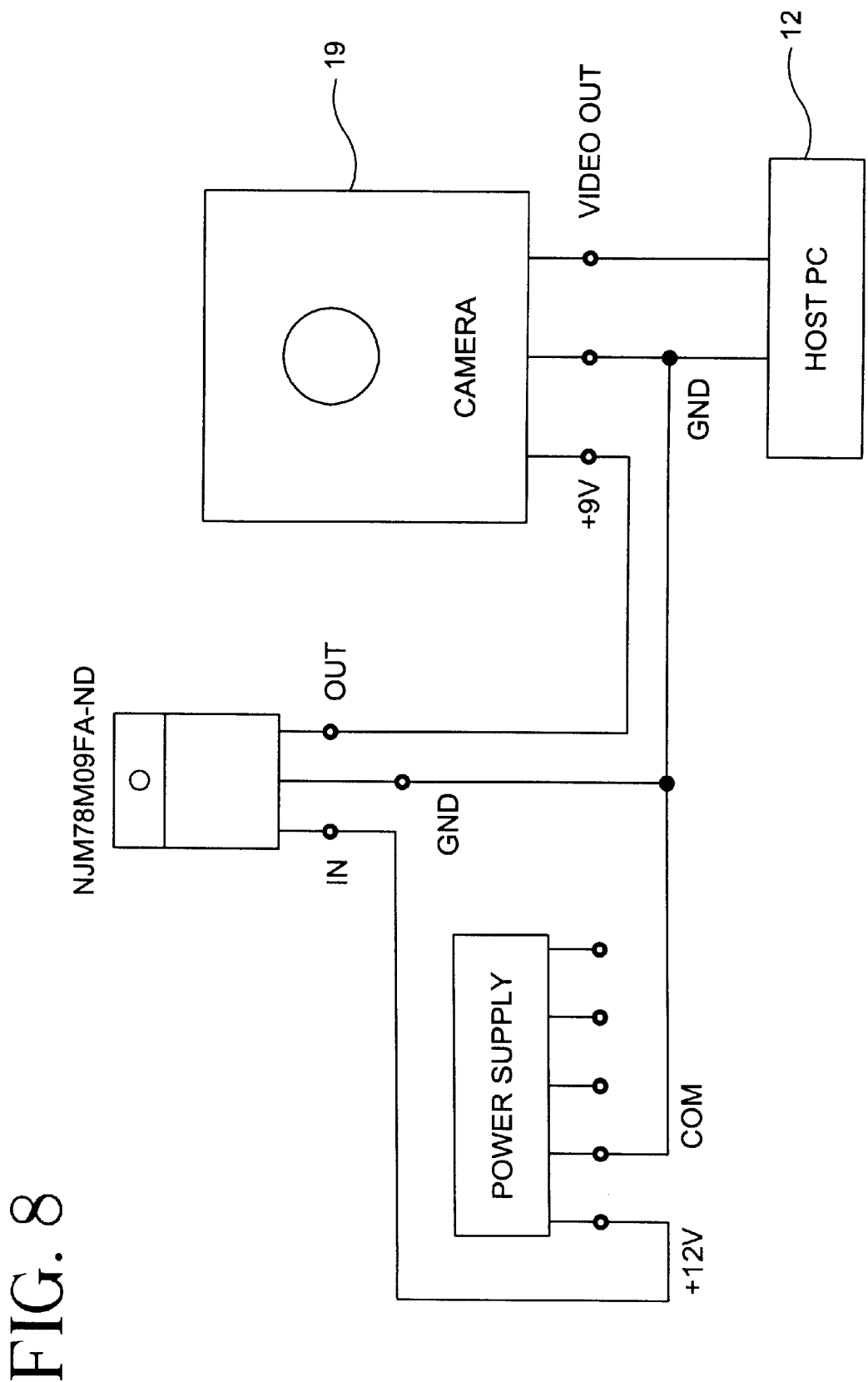
FIG. 8 is a wiring diagram showing the electrical connections of the CCD video camera.

FIG. 8 shows the electric connections of the CCD camera. Because the operational voltage for the camera is +9V, a voltage regulator is used to reduce the voltage from +12V to +9V. The video signal of the camera is connected to a frame grabber video card 15 installed inside the host computer for video image capture. A suitable frame grabber is model Win/TV-HiQ supplied by Hauppauge Computer Works with supporting image processing software. It includes on-board memory to provide 33 frames per second image refreshing rate for live video image display on the computer screen.

Once the beams are accurately pointed at the centers of the scan heads 27, 28 and 29, the LD assembly 36 can then be focused. Focusing of the LD assembly 36 is done by adjusting the position of the lens housing 41 with respect to the laser diode 39. To adjust the position of the lens housing 41, the plunger 52 is driven by the stepper motor 23 via the L-shaped lever 55 to move the lens housing inward or outward with respect to the LD housing 37. Referring to FIG. 6, the L-shaped lever 55 is preferably made from a rigid stainless steel to minimize deflection. The lever 55 is fixed to a movable table 61 of a translation stage 62 such that when the stepper motor 23 is activated, the lever moves in a direction parallel to the optical axis of the LD assembly 36. The two spiral springs 56 mounted on both sides of the plunger 52 provide repulsive forces and insure continuous point contact between the plunger and the lever 55. The lever 55 is also provided with a ball pin 63 so that single point contact is maintained between the lever and the plunger 52 (See Detail "A"). The motion of the plunger 52 must be strictly axial because any radial displacement may cause dislocation of the lens 42 and therefore focusing failure. For this reason, the plunger body portion 64 was designed to have a rectangular shape with rounded corners. A clearance fit in the front opening 53 of the nest 47 ensures proper motion of the plunger 52 in the nest. Resilient contact between the plunger 52 and the lens housing 41 is maintained by the spring 40 inside the LD assembly 36.

The stepper motor 23, along with a mounting plate 65, the translation stage 62 and the lever 55 are mounted to a vertical L-shaped plate 66 which is positioned adjacent the focusing station 21 and 22. The motor 23 includes a coupler 67 which is attached to the motor shaft for engaging with a fine pitch lead screw 68 of the translation stage 62. The lever 55 is mounted to the table 61 of the translation stage 62 for linear movement. The translation stage 62 is driven by the stepper motor 23, via the fine pitch lead screw 68 and the precision bellow coupler 67, in response to a focusing signal generated by the host computer 12. Since the focusing accuracy requirement is high, this lens driving mechanism must be capable of providing linear motion with high resolution. Thus, the stepper motor 23 preferably has a micro stepping capability of about 52,000 steps/rev and the fine pitch lead screw 68 should have approximately 80 threads/in. With this arrangement, linear motion of much less than about 1 μm can be easily achieved. A suitable stepper motor is Model No: PXB44H-02AA-C 1, supplied by Oriental Motors (VEXTA) with a stepper motor driver Model No:

IM483-34P1, supplied by IMC, Inc. A suitable translation stage is Model No: Translation Stage 07T55503, supplied by Melles Griot.

The stepper motor 23 is connected to its corresponding driver 24 according to the operating manual of the stepper motor driver and the driver is connected to the I/O board 14 of the computer 12 via an adapter plate (not shown). An AND logic gate is also connected to the drivers, which enables the motors to be reset either directly from the computer program or from optical limit switches located near the translation stage. Optical limit switches 69 are preferably mounted near the translation stages 62 for safety purposes and as reference position sensors (see FIG. 6). The moving table 61 may be provided with a rectangular slot bracket 70 which serves as a shutter for a light beam emitted from the optical limit switch 69. The length of the slot provided in the bracket 70 would correspond to the traveling distance of the plunger 52. The switch gives full output when the switch's beam completely passes through the slot, and 0 when the beam is fully blocked. The same output signal is also sent to one of the analog input channels of the computer's data acquisition system 13 for use as a reference signal of the focus "homing" procedure. The home reference position is defined as the position where a portion of the switch's beam is blocked. This way the switch also functions as a position sensor for the plunger 52.

Focusing signals for activating the stepper motors 23 are generated by the host computer 12 based on beam width measurements taken by the scan heads 27, 28 and 29. The scan heads 27, 28 and 29 are connected to their respective scan blocks 30 via BNC connectors for receiving and displaying the beam width measurements. To obtain the beam profiles the scan blocks 30 generate a Trigger and Signal output which are sent to the computer 12 via analog input channels of the data acquisition system (DAS) 13. Each time the beam profile at a particular field is to be acquired, the computer checks the status of the Trigger output of the scan block for the scan head in that particular field. Once the Trigger signal is received, the computer starts to sample the Signal output of that same scan block. This way the computer does not need to sample the Signal output continuously but still can capture the beam profile every sampling cycle. The computer's focusing algorithm is discussed in further detail below.

The beam scan heads 27, 28 and 29 utilized in the present invention are rectangular aperture type having an aperture height of 0.05 inches and an aperture width of 0.035 inches. A preferred beam scan head and block combination is BeamScan Head Model # 1180-GP and BeamScan Control Unit Model # 1880-GP, both supplied by PHOTON, Inc. The scanning aperture used in these type of scan heads is a blackened air slit. When the slit scans through the beam, the cumulative signal along the length of the slit produces an averaging effect in resolving the beam's profile. The slit is easy to align with the beam and provides very accurate beam width readings with a high signal-to noise ratio. The scan head also has a rotation mount that allows the scanner to be rotated about the inlet aperture. In the present invention, the scan head is oriented to scan only along the X-axis thereby measuring only the width of the beam.

Figure 9:
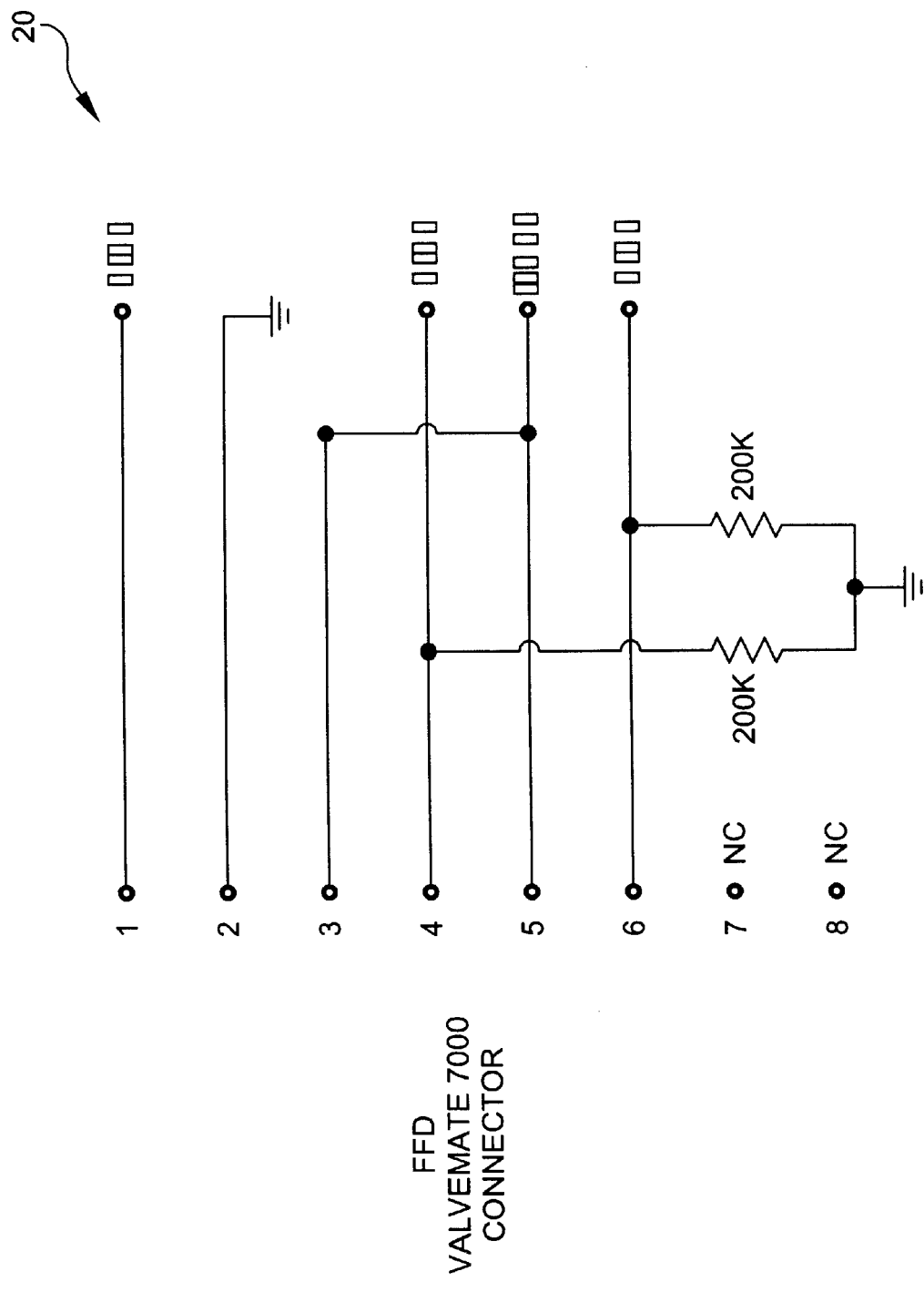
FIG. 9 is a wiring diagram showing the electrical connections of the glue dispensing system.

Once the LD assembly 36 has been focused, the lens housing 41 must be fixed with respect to the laser diode 39. The present invention includes a novel glue dispensing system 20 for this purpose. FIG. 9 shows a simple circuit used to interface the glue dispensing system 20 with the computer 12. The dispensing action can be initiated either directly by the computer 12 through the digital output channel DIO0 of the data acquisition system 13 or by manually pushing a finger button on a glue dispensing gun 71. If done automatically, the glue gun 71 must be accurately positioned in order to apply the glue at the notch 43 of the LD assembly 36. In either mode, the amount of glue dispensed is accurately controlled by a computer controlled valve of the glue gun 71. Once the correct amount of glue is dispensed, the glue dispensing system 20 sends a signal to the computer 12 to initiate the curing cycle. The digital input channel DIO2 of the data acquisition system 13 is assigned to receive the signal from the glue dispensing controller. Once this signal is received, the computer starts counting down the time until the curing period is over. A suitable glue dispensing system 20 may comprise a Model: Valvemate 700 valve controller and a Model: 752V-UH liquid metering valve, both supplied by Assemblyonics, Inc.

Figure 10:
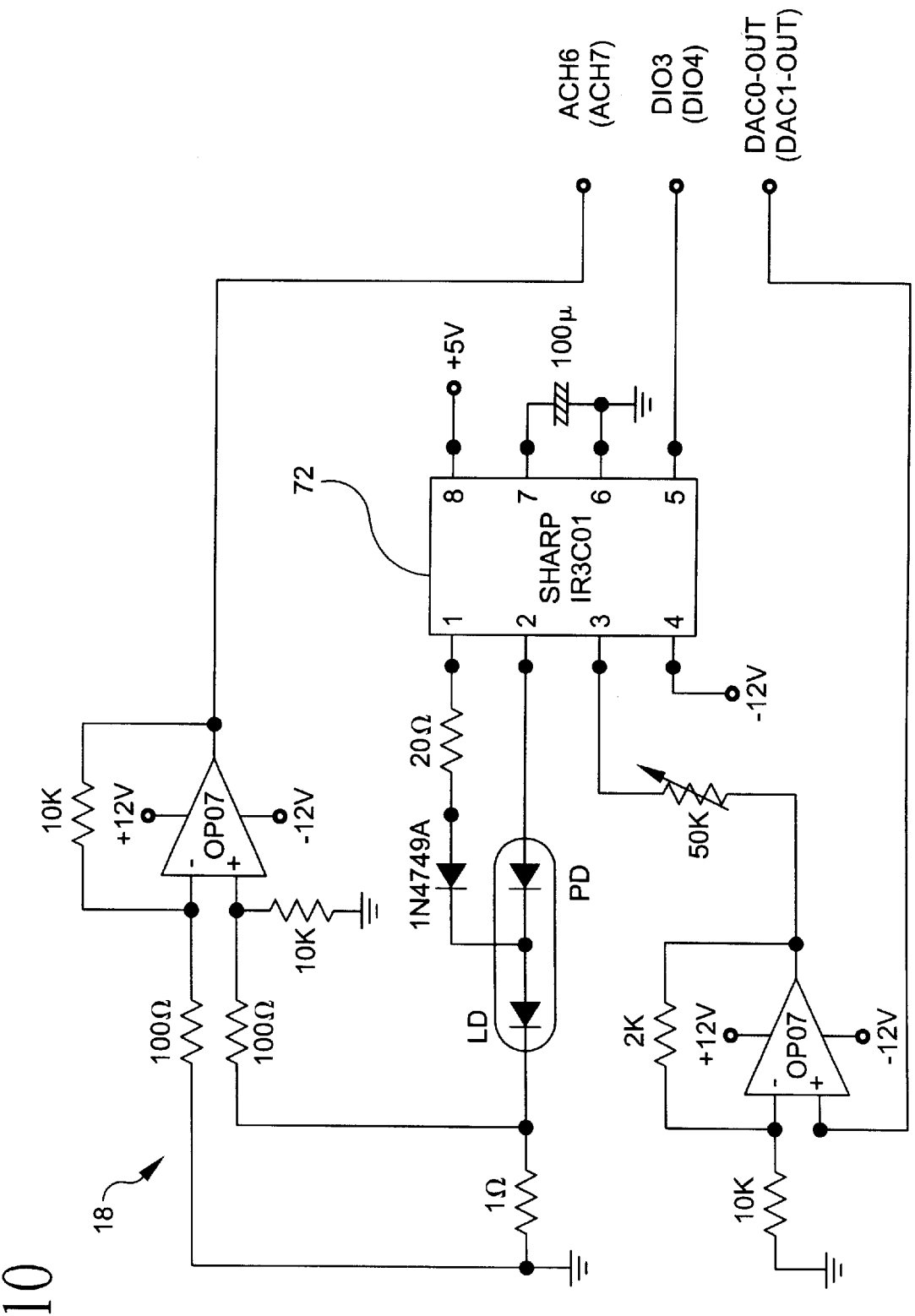
FIG. 10 is a wiring diagram of the laser power-up circuit.

The system 10 also preferably includes a laser power-up circuit 18 housed in the electrical control box 17 together with a triple output power supply (5V, ±12V) which provides the required voltage supply to the circuit. FIG. 10 shows the circuit used to automatically power up the laser diodes. There are preferably two identical units of the power-up circuit 18, one for each focusing station 21 and 22. Preferably, a special IC chip (Sharp IR3C01) 72 designed to slowly power up laser diodes is used to simplify the laser power-up circuit 18. Alternatively, this function may be accomplished by a configuration of discrete components in place of the IC chip. The IC chip 72 requires two voltage supplies of ±5V and −12V and provides the capabilities of turning on/off the laser diode and supplying variable currents to the laser diode 39. The control of the laser power-up procedure is done by the host computer via the data acquisition system 13. A digital output channel (DIO3 for Station #1 and DIO4 for Station #2) of the data acquisition system 13 connected to the No.5 pin of the IC chip is used to turn on/off the laser diode (high for on and low for off). The current supplied to the laser diode is controlled by an analog output channel (DAC0 for Station #1 and DAC1 for Station #2) of the data acquisition system which is connected to the No.3 pin of the IC chip via a voltage amplification circuit with a gain of 1.2. The No.3 pin of the IC chip should always be supplied with a negative voltage. Since the minimum output voltage of the data acquisition system is −10V, the lowest possible voltage supplied to the No.3 pin is −12V which corresponds to the highest possible current supplied to the laser diode. To monitor the current supplied to the laser diode 39, a 1Ω resistor is inserted between the laser diode pin of the laser diode and the ground and the voltage drop across the resistor is amplified with a gain of 100 and sent to the computer via the data acquisition system (analog input channels ACH6 and ACH7 for Station #1 and Station #2 respectively). The current flow through the laser diode is then calculated from this voltage.

Also housed in the same electrical control box 17 is a voltage regulator which drops the voltage required by the CCD camera from +12V to +9V. The +5V output of the triple output power supply is also used for the opto-couplers of the glue dispensing system. On both sides of this control box, there are standard power and signal connectors as well as a fuse housing and a power on/off switch. More specifically, there are two 9-pin D-sub connectors; one is connected to the camera 19 through a 9-pin male-to-male standard computer cable and the other is similarly connected to the glue dispensing controller. Two 25-pin connectors are also mounted on the box; one is to supply current to the lasers as well as to carry the signals from the limit switches back to the data acquisition system while the other is used to connect the circuit box with the data acquisition terminal block. The connections in both cases are done by using two 25-pin standard male-to-male computer cables. The camera signal from the 9-pin connector is sent to the frame grabber video card 15 via a shielded cable with a video connector fixed on the front panel of the circuit box.

To prevent noise from interfering with the video signal of the CCD camera 19 and the laser power-up circuit 18, the drivers 24 for the stepper motors 23 are accommodated in a separate box. An AND logic gate is also installed in the same box to allow enabling and disabling of the motors from either the computer or the limit switches. The drivers are connected to the motors through a 25-pin cable with two connectors one mounted on the box and the other on the setup. The drivers 24 are linked to the digital board through a custom made adapter board which breaks the 50-pin connector from the computer into two 34-pin connectors, one for each driver 24. The power for driving the motors 23 is supplied by a switching power supply with output voltages of +24V and +5V. The power supply is connected to the drivers box through a 9 pin D-sub connector.

As mentioned throughout the detailed description thus far, the operation of the system is controlled by a host computer 12 including a data acquisition system 13, a digital I/O board 14, and a frame grabber video card 15. The data acquisition system 13 is used to acquire beam profile data from the scan blocks 30, to check the output voltages of the limit switches 69, and to receive the completion cycle signal from the glue dispensing system 20. In addition, it controls the laser power-up circuit 18 and monitors the laser current. The digital I/O board 14 is basically used to control the stepper motors 23 through the drivers 24, and the frame grabber 15 is used to digitize the video signal from the CCD camera 19 and display the live video image on a computer screen. The data acquisition system 13 is preferably a system that provides a sampling speed of about 1.25 million samples/second. It preferably includes 16 single-ended or 8 differential 12-bit analog input channels, 2 12-bit analog output channels and at least 8 digital input and output channels. A suitable data acquisition system is Model AT-MIO-16E-1 Enhanced Multifunction I/O Data Acquisition ISA Board and Model PC-DIO-96 Digital I/O ISA Board with Visual Basic Libraries Application Software all supplied by National Instruments, Inc.

Actual operation of the system can best be explained through the following description of the system's computer software and its related functions. The system according to the present invention includes software developed in the Windows environment using MS Visual Basic and the DASDLL function call driver. The actual computer source code in accordance with the present invention is provided herewith in the annexed Appendix and is incorporated herein as part of the disclosure of the invention.

The software is divided into two levels: the "Operator Level" and the "Engineer Level". The Operator Level is designed primarily for an operator to focus the LD assemblies as accurately and quickly as possible. The Engineer Level is designed for engineers to setup the system and the process, and therefore much more capabilities and options are provided. Upon turning on the computer, a start-up form is provided on the computer screen which allows the user to choose which level to be activated.

Figure 11:
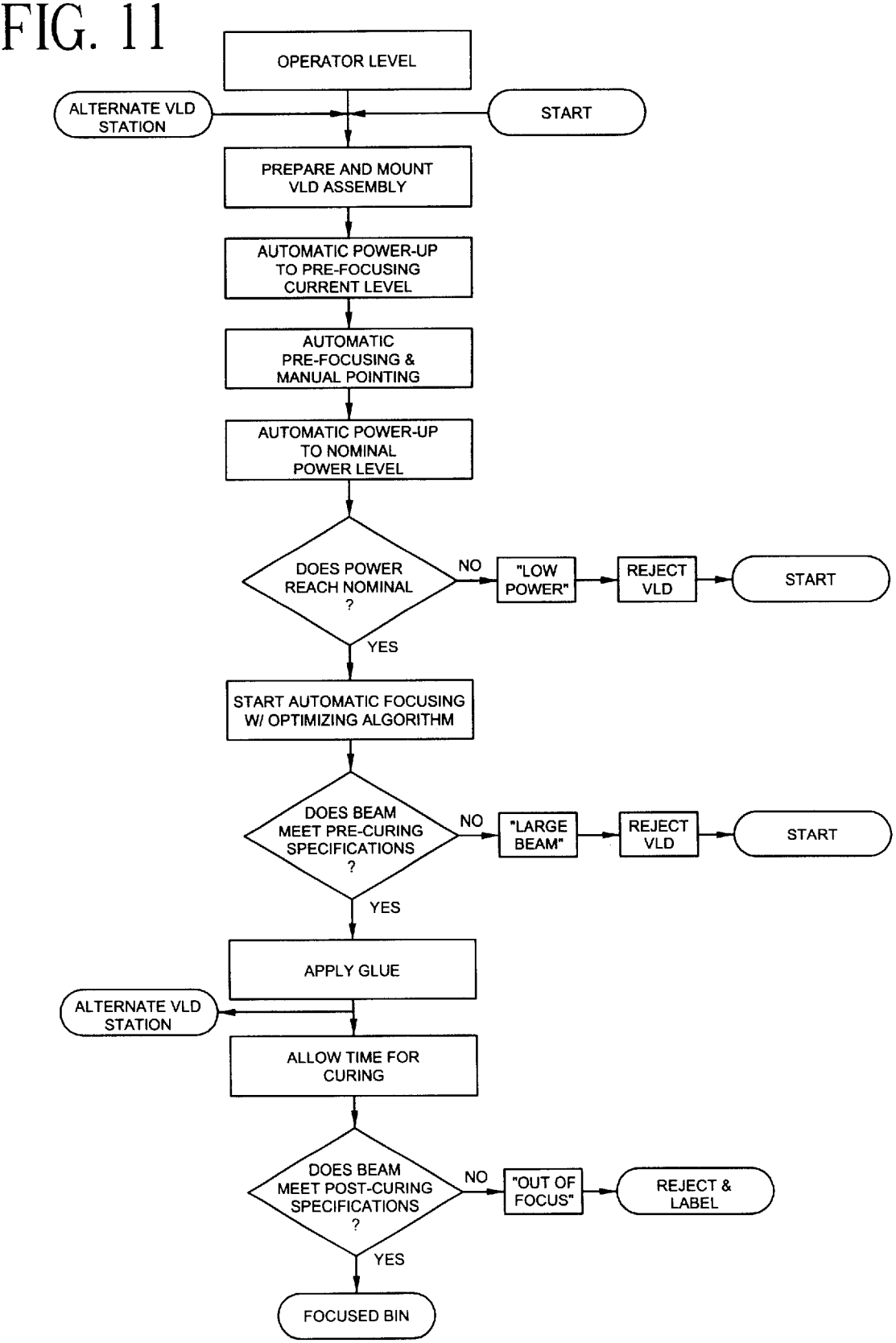
FIG. 11 is a flowchart illustrating the computer software's functions within the Operator Level.

FIG. 11 is a flow chart illustrating the steps within the Operator Level. Upon entering the Operator Level, an Operator Focusing Form is displayed and the computer software reads-in the initialization parameters from an initialization file (focus.ini, located in c:\focus\config\). The parameters included in the initialization file are, the LD model name, the power calibration coefficients obtained during calibration of the laser power measurement, and the X and Y coordinates of the center of the aperture of the far-field scan head obtained during camera calibration. Next, a configuration file which contains all the focusing parameters for that particular LD is loaded. (Initialization and configuration files are developed during the calibration procedures performed within the engineer level discussed below. If the engineer had chosen another model in the engineer level, the new model type would be saved in the initialization file and the corresponding configuration file would be loaded.)

The information displayed on the Operator Focusing Form are the assembly type of the LD, the last name of the operator, the date, the lot number, the assembly number and the station number on which the assembly is mounted. This data is displayed in panel controls, with each panel having a corresponding label as the title. In addition, the form has a Next command button, a schematic figure of the setup and a message label positioned at the bottom of the form. The schematic figure visually indicates the status of each station, and the action to be taken by the operator. (Whenever an action is to be taken by the operator, the message indicating the action is blinking). Toggle keys, e.g., F1, F2, F3, Esc, are also provided to turn on or off the process charts, the beam widths and their graphical indicators, the laser power and current displays, and the Exit button, respectively.

At first, the message label instructs the operator to assemble the LD housing 37, the lens housing 41 and the spring 40 together and mount this assembly into station #1 21. It also instructs the operator to connect the power supply to the LD assembly 36 in station #1 21 and then to hit the Enter key on the keyboard. This message scrolls across the width of the message label periodically until the Next button or Enter key is pressed. At this stage, station #1's focusing plunger 52 is at its initial retracted or "home" position which gives enough room for the LD assembly 36 to be mounted into the station. Once the operator has assembled the LD assembly 36, mounted the assembly into station #1 and connected the power supply to the assembly, he/she presses the Enter key. This, in turn, activates the Next button on the form and the laser diode is powered up to the pre-focusing current value through the laser power-up circuit 18. A new message appears on the message label informing the operator that the computer is powering up the LD assembly 36 to the pre-focusing current level. Once the pre-focusing current level is achieved, the message label informs the operator that the computer is now "homing" and pre-focusing the laser beam. The label near station #1 of the schematic layout displays the message, Pre-focusing. At this stage, the computer sends a signal to the stepper motor driver 24 to activate the stepper motor 24. The stepper motor 24 responds by translating the lever arm 55 along with the focusing plunger 52 thereby driving the lens housing 41 inward a fixed number of steps to pre-focus the beam on the far-field scan head 29. Once the beam is reasonably focused in the far-field, centering the beam on the aperture of the far-field scan head 29 will be easier and more accurate. After pre-focusing is complete, the Camera form is displayed for pointing.

The Camera form for the Operator Level has the real-time image of the far-field scan head 29, a message label to give instructions to the operator, a set of reference target cross-hairs (the intersection of which represents the center of the aperture of the far-field scan head), a tolerance circle around the center, the schematic layout of the setup, and a Done button. In manual pointing mode, the message label instructs the operator to adjust the goniometers 57 and 58 and rotational stage 59 centering knobs on station #1 to bring the image of the laser spot on the screen to the intersection of the cross-hairs and then to hit the Enter key. In automatic pointing mode, the computer software activates the algorithm described below and sends signals to the pointing stepper motors 60 to automatically adjust the goniometers and rotational stage to center the laser spot on the scan head. In either mode, a blinking label near station #1 of the schematic layout displays the message, Pointing.

Once centering is complete, the operator hits the Enter key which causes the Camera form to disappear and the Operator Focusing Form to be redisplayed. At this point, the computer automatically powers up the LD through the laser power-up circuit 18 to a level that is within the power tolerance. If during power-up, the laser power does not reach the tolerance zone, the power to the LD assembly 36 in station #1 is shut-off and the plunger 52 is driven back to its "home" position. Also, the message label informs the operator that the LD assembly has failed at the power-up stage, instructs him/her to disconnect the current supply from station #1, remove the LD assembly from station #1, place it in a bin marked Defective and mount a new LD in station #1. If the system is able to power-up the LD assembly in station #1 to within the laser power tolerance, the message label informs the operator that the computer is automatically focusing the LD assembly in station #1. The label near station #1 of the schematic layout displays the message, Focusing.

During focusing, the DAS 13 waits for the trigger signal of the near-field scan head 27 to cross the predetermined trigger level. Once this happens, the DAS 13 takes in 300 data points which represent the beam profile at the near location from the signal output of the controller block. A computer algorithm then calculates the beam width based on the predetermined clip level. The same process is then repeated sequentially for the mid- and far-field scan heads 28 and 29 to acquire the beam profiles at these locations. Once the beam profiles are acquired, the computer calculates the focusing error and sends a signal to the stepper motor driver 24 to adjust the focusing station plunger 52 inward or outward to optimize the beam width. The data acquisition and automatic focusing algorithms are described in further detail within the engineer level discussed below.

During automatic focusing, if the pre-curing focusing specifications are not met, the software will display the error code message, Large beam. This failure occurs when the beam is not able to meet pre-curing focusing specifications at all focusing distances. In such a case, the software shuts off power to station #1, moves the plunger 52 to its initial position and instructs the operator to remove the LD assembly 36 in station #1 and place it in a bin marked Defective. If the pre-curing focusing specifications at the focusing distances were achieved, the message label will prompt the operator to position the glue gun 71 over the notch 43 of the LD assembly 36 in station #1 and push the trigger switch. The label near station #1 of the schematic layout displays the message, Curing. Once the operator triggers the glue dispenser, a controlled amount of glue is applied to the LD assembly in station #1. The amount of glue to be dispensed is controlled by the glue dispensing controller 20. Once the glue is dispensed, the controller 20 sends a signal back to the computer 12 which causes the computer to initiate the curing cycle (typically 45 seconds) for station #1, turn off current supply to station #1, and instruct the operator to assemble a new LD assembly and mount it into station #2. During the curing period in station #1, focusing and assembly of a new LD is carried out in station #2 as described above. Once the curing period in Station #1 is completed, the LD assembly is powered back to its nominal power level and the DAS 13 automatically acquires another set of 900 data points from the three beam scanners 27, 28 and 29 to check if the focusing is still within the preset tolerance, or in other words, if the curing is successful or not. Appropriate messages are then displayed to instruct the operator to either accept or reject the assembly.

Upon completion of each cycle, the software saves important process information, such as the name of the operator, date, assembly model name, the assembly number of the LD assembly, the lot number, the station number on which the LD assembly was focused and assembled, the laser current value, laser power, beam width values and clip levels at all focusing distances, the optimization function obtained during automatic focusing, the variation of the beam widths from their nominal values at each focusing distance and beam profile information in a data file.

Figure 12:
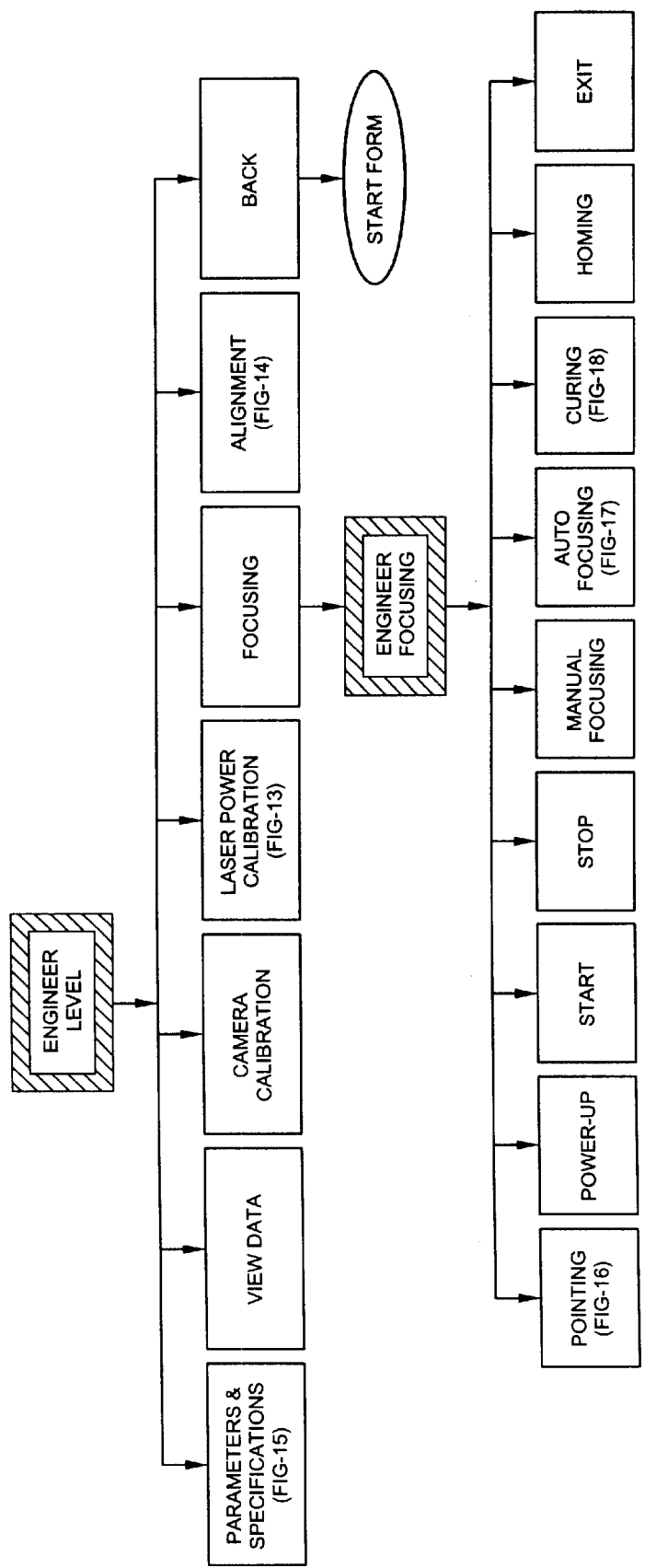
FIG. 12 is a flowchart illustrating the computer software's functions within the Engineer Level.

Accessing the Engineer Level, on the other hand, allows for setup and calibration of the system. FIG. 12 is a flow chart illustrating the various options available to the engineer in the Engineering Level. The Engineering Options form provides the tools for the engineer to set up the system and the focusing process. Engineers use this form to calibrate laser power, calibrate the camera used for beam-centering, analyze and adjust the deviation of the laser beam from the aperture centers of the near, mid and far-field scan heads, view and analyze data files which give information on previously focused LDs, automatically and manually focus and assemble LD assemblies, and view and modify focusing parameters if necessary. The options present on this form and their functions are listed below.

Power Calibration

Figure 13:
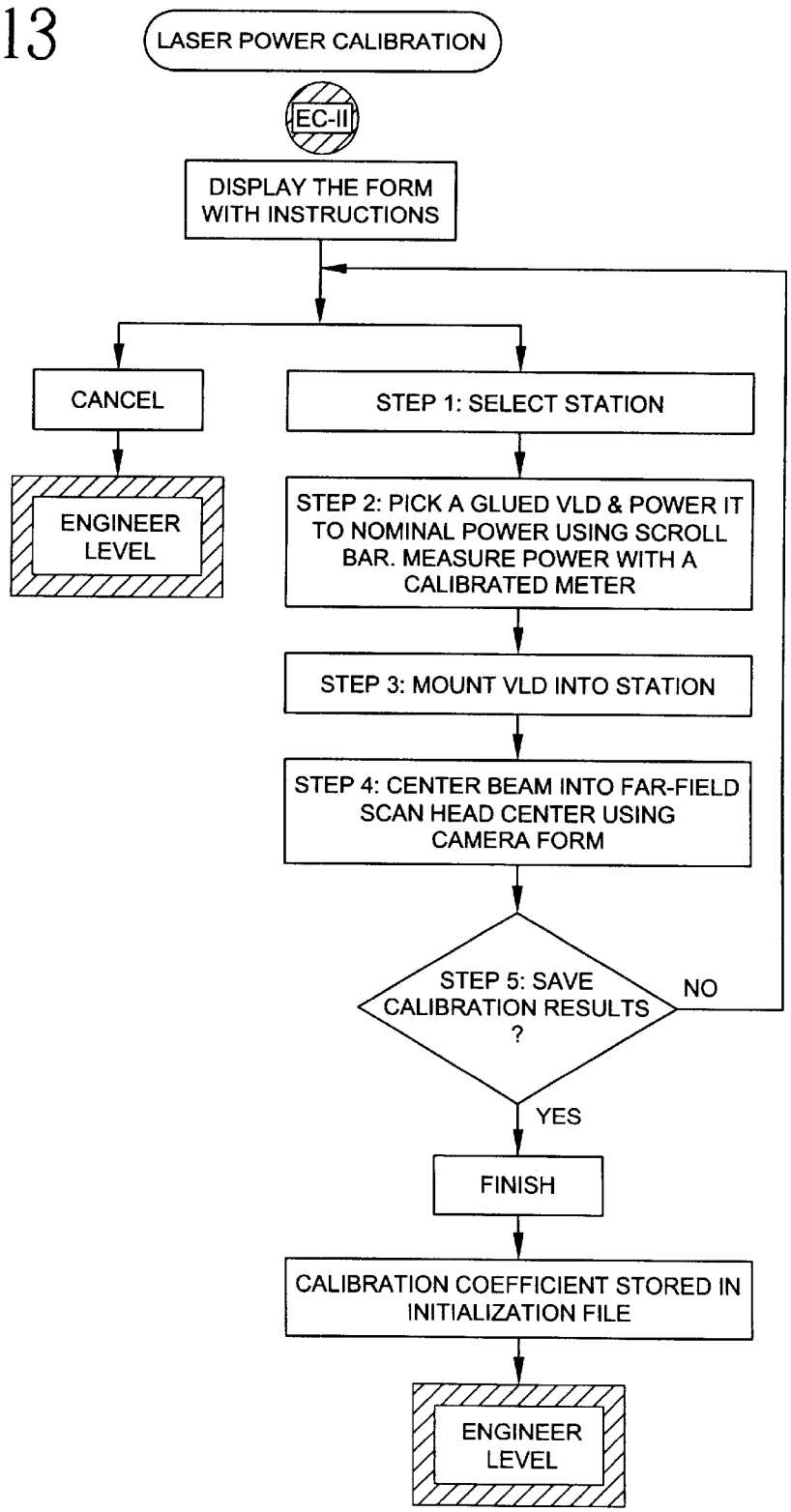
FIG. 13 is a flowchart illustrating the computer software's functions during the Laser Power Calibration procedure.

Clicking the Power Calibration button will take the engineer to the Power Calibration form that is used to calibrate the laser power measurement for both station #1 and station #2. FIG. 13 is a flow chart illustrating the steps of the Laser Power Calibration procedure. A calibration form is displayed during the procedure which contains step-by-step instructions for power calibration and command buttons to take the engineer through the calibration steps. Once calibration is complete, the calibration coefficients are automatically stored in the initialization file.

The calibration of the laser power measurement is done in five steps. First, the station in which a cured LD assembly is mounted is selected. Second, the LD assembly is connected to the power supply, powered up to the nominal laser power and the power level is verified by using a power meter. To gradually power-up the LD assembly, the engineer clicks a scroll bar and the resulting increase in voltage is displayed in a voltage text box. The engineer stops adjusting the scroll bar once the power meter shows that the laser power has reached nominal value. The third step in the power calibration operation is to mount the LD assembly into the station selected in step 1 without changing its output power. The next step in the power calibration process is to center the laser beam from the LD assembly onto the aperture of the far-field scan head. The engineer's task is to manually adjust the centering knobs of the goniometers 57 and 58 and the rotational stage 59 under the diode nest 47 so that the image of the laser beam on the computer screen falls within the tolerance circle and as close to the center as possible. Finally, the software asks the engineer whether he/she would like to carry out power calibration or cancel the operation.

Clicking a Next button would cause the application to compute the power calibration coefficient and store this value in the initialization file. This coefficient will be used henceforth to calculate the calibrated laser power of LD assemblies during focusing and assembly. The power calibration operation could similarly be carried out for the other assembly station.

Camera Calibration

Clicking this button takes the engineer to the Camera Calibration form which is used to calibrate the CCD camera used for centering the laser beam on to the far-field scan head. The Camera Calibration form has horizontal and vertical scroll bars that can be adjusted so that the center of the aperture of the far-field scan head coincides with the center of the cross-hairs and tolerance circle. Once calibration is complete, the position of the center of the cross-hairs and circle is stored in the initialization file which will then be retrieved each time upon the start of the system.

Alignment

Figure 14:
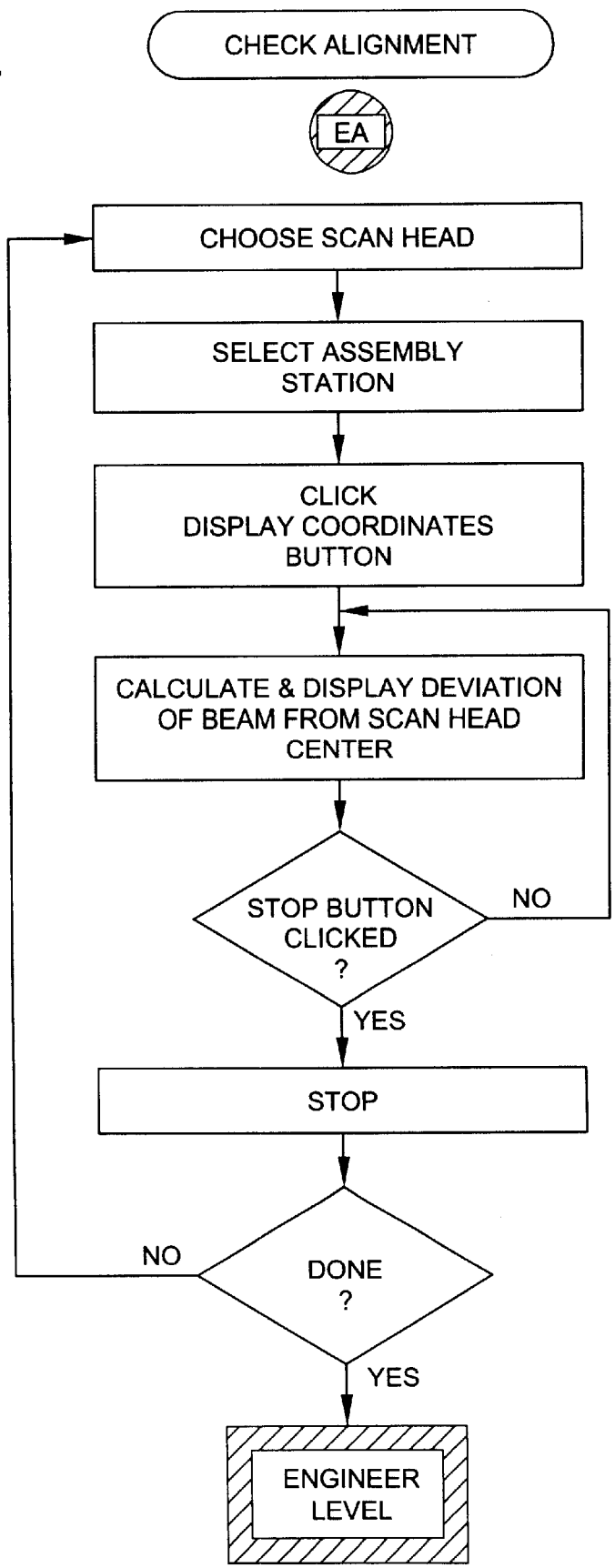
FIG. 14 is a flowchart illustrating the computer software's functions during the Check Alignment procedure.

Clicking the Alignment button will take the engineer to the Alignment form which is used to examine the deviation of the laser beam from the apertures of the near, mid or far-field scan heads. This form is useful for the optical alignment of the system. For a given station and a given scan head, this form will display the deviation of the laser beam from the aperture center. The functions of the various controls on the Alignment form are illustrated in the flow chart of FIG. 14.

Three option buttons at the top of the form correspond to the near, mid and far-field scan heads. The engineer can choose the scan head to be checked, by clicking any one of the option buttons. The engineer then selects the station on which to perform the alignment test. On clicking the Display Coordinates button, a text box will display the deviation of the laser beam from the aperture center of the scan head.

Parameters

Clicking this button will take the engineer to the Parameters form that is used to view the focusing parameters of the selected LD model. The focusing parameters that are displayed are the LD model name, focusing distances of the near, mid and far-field in mm, clip levels at which the beam width is measured at the near, mid and far-field locations as a percentage of the peak laser power, specified nominal beam widths at the near, mid and far-field locations in $\mu$m, etc.

Figure 15:
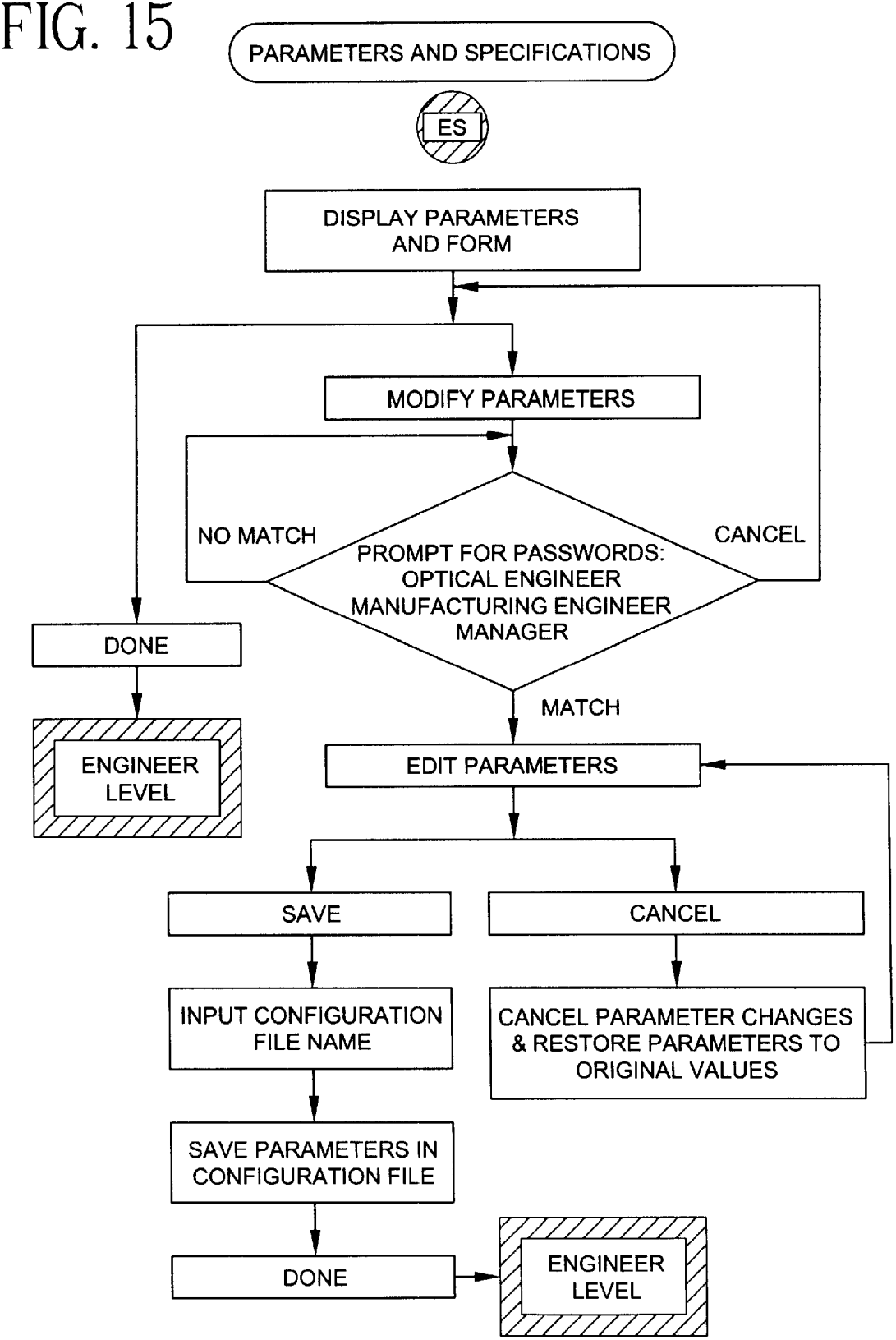
FIG. 15 is a flowchart illustrating the computer software's functions during the Parameters and Specifications procedure.

FIG. 15 is a flow chart illustrating the functions of the Parameters forms. All the focusing parameters are displayed in text boxes. All the text boxes are read-only unless correct passwords are supplied. In that case, any of these text boxes can be modified. If the engineer intends to alter any focusing parameter, an additional password is required. If the passwords are correct and the OK button is clicked, the Parameter Password form would disappear and the Parameters form would be reloaded, but this time all text boxes containing the focusing parameters can be modified by the engineer. In addition, the Parameters form will now have a Save, Cancel and Done command buttons which allows the engineer to save modified parameters in configuration file for the selected LD. If the engineer clicks on the OK button, the new parameters are saved in the specified configuration file. When this particular LD assembly is selected again later, the new parameters will take effect.

View Data

Clicking this button will take the engineer to the View Data form which provides features to view the focusing data of the previously focused LD assemblies. The View Data form displays information such as LD model, beam widths, beam profiles, clip levels, process charts, focusing deviation and other related data for each assembly focused.

Information about all the assemblies that operators focus and assemble are stored in data files for future review and process tracking. Each data file contains process data of 100 consecutive assemblies focused and assembled by the same operator. Engineers can access this information by clicking on the View Data command button in the Engineering Options form. This brings up the View Data form which contains various areas to display information about previous focusing and assembly data and an Open File button and a Done button.

More specifically, the View Data form contains process charts, text boxes which display the LD assembly name, operator who focused and assembled the LD assembly, date on which the LD was assembled, lot number of the LD assembly, the number of assemblies that were assembled (which is presented in a combo box) and the station in which that particular laser diode was assembled. In addition, the View Data form has text boxes which show the clip level setting at the near, mid and far-field locations, picture boxes which graphically display the beam profiles at the near, mid and far-field distances, text boxes which display the beam width readings obtained at the near, mid and far-field locations, picture boxes which graphically display the post-curing beam width tolerances and graphically indicate the beam width reading at the near, mid and far-field locations. For some types of LD assemblies, only two distances may be required. In such cases, picture boxes and text boxes for the field that is not required would be blank. The form also has text boxes which display the current supply and the laser power. There are four process charts; one shows the focusing deviation for each laser diode assembled, and the other three show the variation in beam width from the nominal at the near, mid and far field, respectively.

Focusing

On clicking the Focusing button, the engineer is taken to the Engineer Focusing form. This form allows the engineer to automatically power up LD assemblies, manually or automatically point laser beams, view real-time beam profiles, beam widths, etc., manually or automatically focus LDs, change the clip levels and observe the resulting variations in beam widths and beam profiles and conduct other useful engineering analysis.

The Focusing form has three picture boxes, each graphically displaying the profile of the laser beam at the near, mid and far-fields, three corresponding text boxes that display the clip levels at the near, mid and far-fields and three more text boxes that display the beam width at the near, mid and far-fields. In addition, there are three picture boxes that graphically display the beam width tolerances at the near, mid and far-fields. These picture boxes each have an indicator bar that visually reflects the changes in the beam width at the near, mid and far-field, respectively. For assemblies with specifications in one or two of the fields, text boxes and picture boxes for the field or fields that are not specified are left blank. There is also a picture box that graphically displays the percentage of the obtained Optimization Function, described in further detail below. Also, command buttons are included for powering up the laser diode to the initial pre-focusing current, pre-focusing, centering the laser beam, initiating data acquisition, terminating data acquisition, performing manual and automatic focusing, initiating gluing and exiting the form. The form also contains text boxes which indicate in real-time, the current supplied to the LD assembly and the measured laser power. Menu items are also provided for saving and opening data files and viewing and changing focusing parameters. Menu icons are provided for opening and saving data files, calibrating laser power measurement, camera calibration, and viewing and altering focusing parameters. The Focusing form also has a label that displays instructions or status messages for the engineer.

Figure 16:
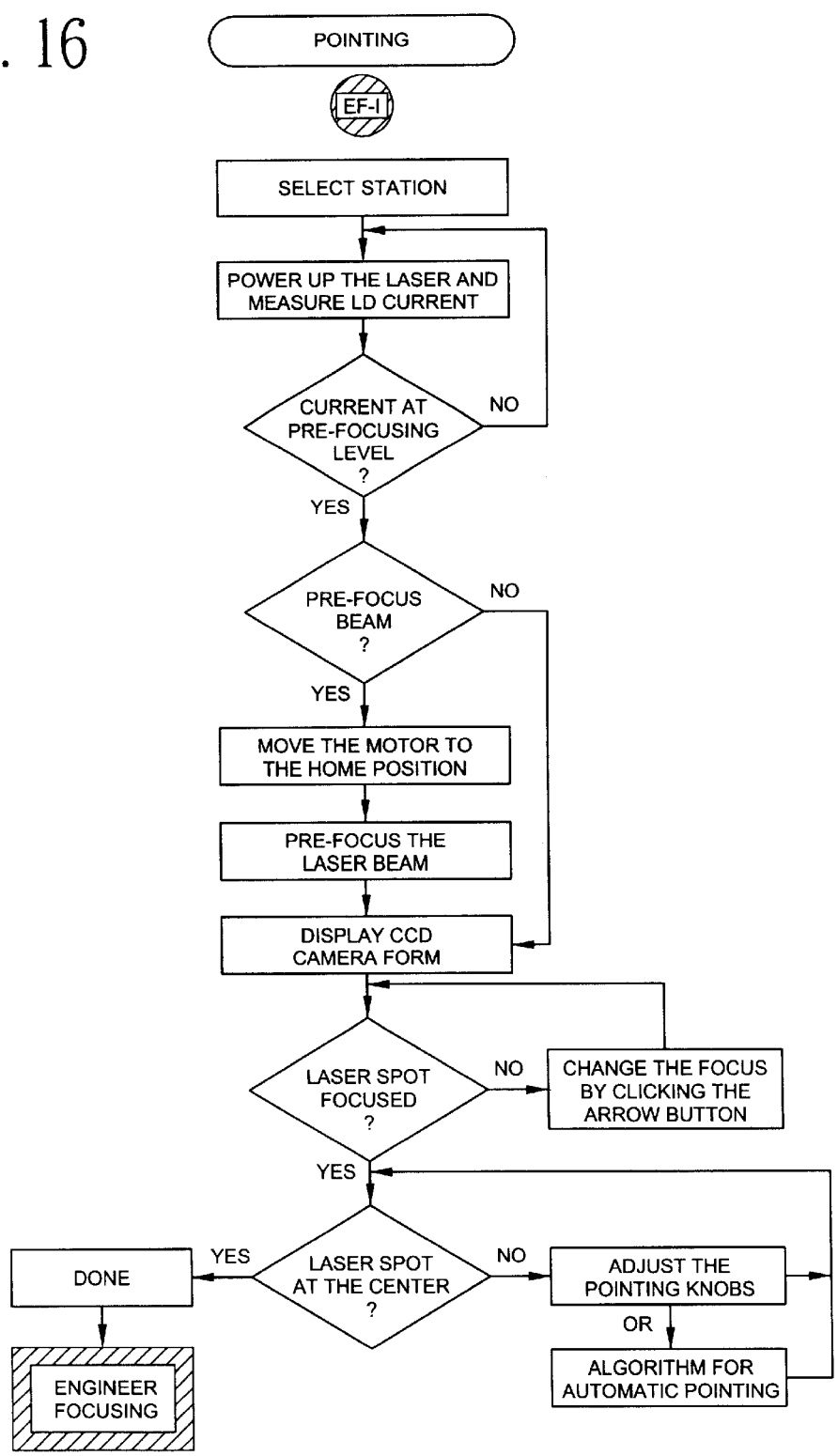
FIG. 16 is a flowchart illustrating the computer software's functions during the Pointing procedure.

FIG. 16 is a flow chart illustrating the steps of the pointing procedure within the Focusing form. The first step to assemble a LD assembly is to click on a Point button. This brings up a new window for the selection of the station in which the LD assembly is mounted. Once the station is selected, the LD will be powered up to the pre-focusing level. This power-up process is iterative which periodically gets feedback from the power-up circuitry. If the laser is not connected, a warning message is displayed and the engineer is instructed to connect the laser and then click the Point button. Next, a new window appears asking the engineer whether to pre-focus the beam or not. If the command button Do Not Pre-focus is clicked, the camera form is displayed for pointing. If the engineer selects to pre-focus the beam, the stepper motor will drive the plunger to pre-focus the beam. The distance traveled by the plunger in order to achieve pre-focusing is determined experimentally. Once pre-focusing is complete, the camera form is loaded and displayed. At this point, if the pre-focusing is not satisfactory, the engineer can adjust the focusing of the beam manually by using the spin buttons on the camera form. When the left spin button is clicked, the plunger will move out and when the right spin button is clicked, the plunger will move in. The next step is beam-centering which is accomplished either by manually adjusting the pointing knobs to bring the laser beam spot within the tolerance circle and as close as possible to the intersection of the cross-hairs or by initiating an automatic pointing algorithm.

The automatic pointing algorithm initiated within the Engineer Level is identical to that which may be activated within the Operator Level. With automated pointing, the CCD camera captures an image in the Windows Device Independent Bitmap (DIB) file using a computer frame grabber video card having supporting software for various image processing needs. An appropriate video card with supporting software for this purpose is Model Win/TV-High-Q supplied by Hauppauge Computer Works.

Windows bitmap files are stored in a DIB format that allows Windows to display the bitmap on any type of display device. The term device independent means that the bitmap specifies pixel color in a form independent of the method used by a display to represent color. The default filename extension of a Windows DIB file is ".BMP". The three parts of a DIB file are described as follows.

1) Bitmap-File Structures

Each bitmap file contains a bitmap-file header, a bitmap-information header, a color table, and an array of bytes that defines the bitmap bits. The bitmap-file header contains information about the type, size, and layout of a device-independent bitmap file. The header is defined as a BITMAPFILEHEADER structure. The bitmap-information header, defined as a BITMAPINFOHEADER structure, specifies the dimensions, compression type, and color format for the bitmap. The color table, defined as an array of RGBQUAD structures, contains as many elements as there are colors in the bitmap. The color table is not present for bitmaps with 24 color bits because each pixel is represented by 24-bit red-green-blue (RGB) values in the actual bitmap data area. The colors in the table should appear in order of importance. This helps a display driver render a bitmap on a device that cannot display as many colors as there are in the bitmap. If the DIB is in Windows version 3.0 or later format, the driver can use the biClrImportant member of the BITMAPINFOHEADER structure to determine which colors are important. If the CCD camera used in the setup is monochrome, the DIB file is first stored in an 8-bit gray scale format. It is also conceivable to store the bitmap image in memory and process it directly instead of writing it to a file.

The BITMAPINFO structure can be used to represent a combined bitmap-information header and color table. The bitmap bits, immediately following the color table, consist of an array of BYTE values representing consecutive rows, or "scan lines," of the bitmap. Each scan line consists of consecutive bytes representing the pixels in the scan line, in left-to-right order. The number of bytes representing a scan line depends on the color format and the width, in pixels, of the bitmap. If necessary, a scan line must be zero-padded to end on a 32-bit boundary. However, segment boundaries can appear anywhere in the bitmap. The scan lines in the bitmap are stored from bottom up. This means that the first byte in the array represents the pixels in the lower-left corner of the bitmap and the last byte represents the pixels in the upper-right corner.

2) Information Header

The information header includes detailed information about the bitmap format and a color table. The color table is not used if the DIB file is in 8-bit gray scale format. The BITMAPFILEHEADER structure contains information about the type, size, and layout of a device-independent bitmap (DIB) file.

3) BITMAPINFO Structure

The BITMAPINFOHEADER structure contains information about the dimensions and color format of a Windows 3.0 or later device-independent bitmap (DIB). The BITMAPINFO structure fully defines the dimensions and color information for a Windows 3.0 or later device-independent bitmap (DIB).

The LD image is captured by calling a function within the video card software (e.g., WinTV DDL) to generate a DIB file of 400×480 pixels in the 8-bit gray scale format. The function is preferably as follows:

PCV_SaveImageRect(pFile,xLeft,yTop,width,height,wFileType,wOptions)

This function reads a rectangular block of pixels from the video frame buffer, converts the data, and writes this to the specified file in the specified image format.

| Parameter | Type | Description |
| --- | --- | --- |
| pFile | LPSTR | Pointer to a file name string |
| xLeft | Word | Pixel coordinate of left side of block |
| yTop | Word | Pixel coordinate of top side of block |
| width | Word | Width of block in pixels |
| height | Word | High of block in pixels |
| wFileType | Word | File type |
| wOptions | Word | Miscellaneous Options (must be 0) |
| Return Value | <0 | Number of colors found in the original image |
| | 0 | Error reading the video buffer |
| | −1 | File creation error |
| | −2 | Memory allocation error |
| | −3 | File write error |

In Visual Basic

Declare Function PCV_SaveImageRect Lib "pcvideo.dll"

(ByVal FileName As String,

ByVal xpos As Integer,

ByVal ypos As Integer,

ByVal xsize As Integer,
ByVal ysize As Integer,
ByVal filetype As Integer,
ByVal Options As Integer)
    iSave=PCV_SaveImageRect(FileName,0,0,w,h,2,0)

During automatic pointing, an image iof the laser spot on the far-field scan head is taken by the CCD camera and stored as a bitmap file either in memory or in the computer's harddrive. First, the whole bitmap file is read and a threshold is computed according to the average intensity (0 to 255) of the pixels. Once the threshold is determined, the entire pixel data are scanned to determine the estimated center of the LD beam image. This is a preliminary scanning to estimate the location of the beam. Because there is noise and other grid lines or small blobs elsewhere in the bitmap, the estimated center may not be very accurate during the preliminary scanning. Second, the estimated center of the beam is isolated and a window is defined around the beam of approximately 7 to 10% of the entire map. The center of the beam is then recalculated within this window. By doing so, the noise and grid lines that are far away from the beam will be excluded, thereby rendering a much more accurate center. The image processing program, then calculates the x-y coordinates of the beam image. This information is then compared with the known x-y coordinates of the center of the far field scan head and difference values are generated. Difference value signals are then provided to the additional pointer stepper motors 60 connected to the goniometers and rotational stage of the focusing station which in turn brings the LD beam to the center of the far field scan head. Thus, automatic pointing of the laser beam can be achieved.

When centering is complete, the engineer clicks on the Done button and exits the Camera form. The next step is to click the power button which powers the LD up to the nominal power level. If the laser power does not reach the lower limit before the current supply reaches its maximum value, a message of Low Power is displayed and the LD assembly should be discarded. Otherwise, if the laser power is within tolerance, the LD assembly is ready for focusing.

The engineer can manually focus the laser beam by clicking the M. Focus button. This brings up a panel which contains controls to manually focus the laser beam. When the engineer clicks on the Start Acquisition button within the Focusing form, the DAS 13 begins taking data points representing the beam profiles from each scan head. A computer algorithm then calculates the beam width based on the predetermined clip level and displays the beam profile and the beam width value on the Near window of the computer screen. The clip levels for the dynamically changing beam profiles of the laser beam at the near-, mid- and far-field locations are presented visually as lines drawn across the beam profiles in three picture boxes. The corresponding numeric clip level values are also displayed. The clip level can be set at any value from 0% to 100% and the beam width of the laser beam at the three locations are calculated based on the clip levels set at these locations. The beam widths and beam profiles are displayed in real time, thus showing the changes of the beam over time. Upon activating the stepper motor to adjust the plunger of the focusing station or upon manually adjusting the lens housing of the LD assembly, the resultant changes in beam widths and profiles at the three locations are thus immediately reflected in the three picture boxes and text boxes.

The engineer can also change the resolution of the motor, adjust the type of motor movement to jog or continuous motion or reset (disable) the motor. The manual focusing panel has a horizontal scroll bar to change the motor resolution, left and right arrow buttons to drive the motor in either direction in the jog mode, a scroll bar for driving the motor continuously in either direction and Reset and Done command buttons. Clicking the Done button on the manual focusing panel will cause the manual focusing panel to disappear. Clicking the Reset button on the manual focusing panel will disable the motor.

Figure 17:
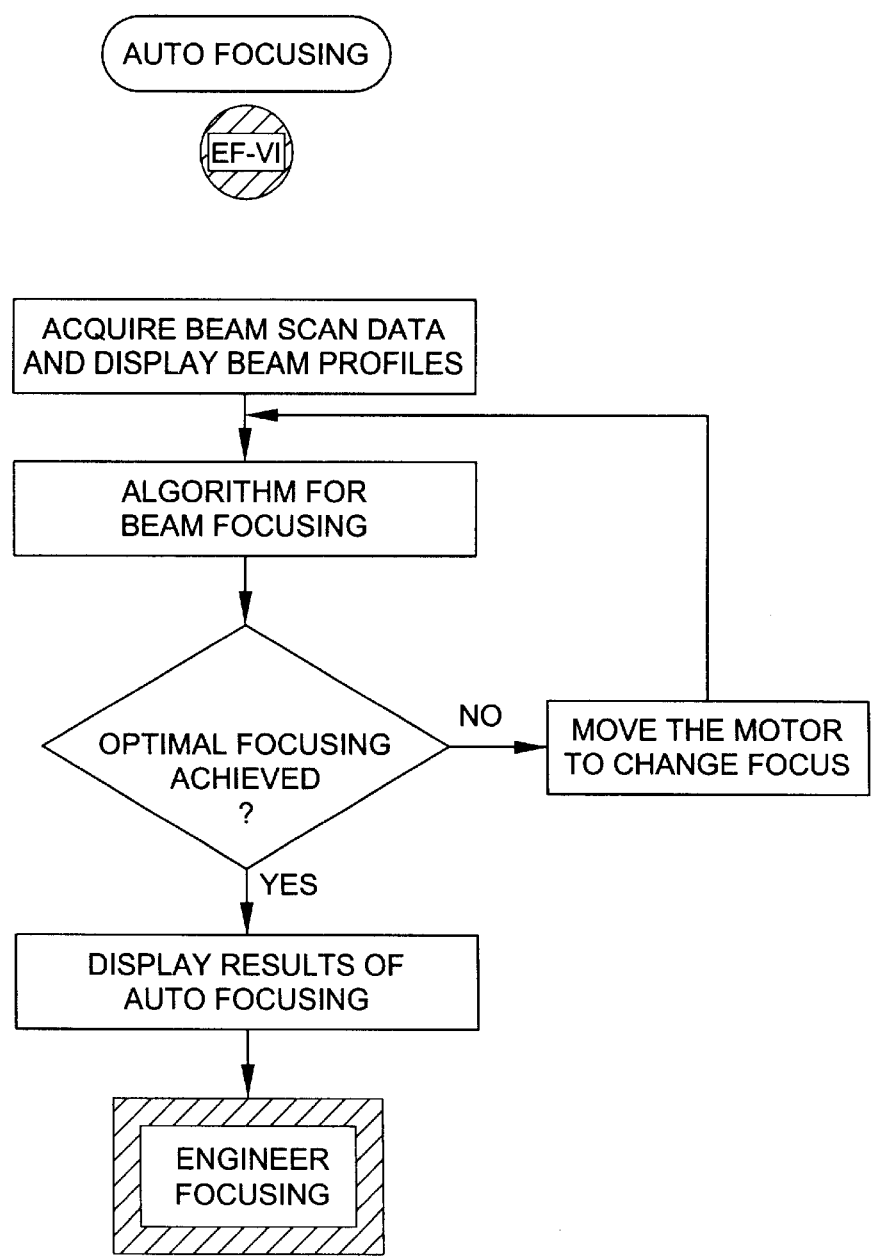
FIG. 17 is a flowchart illustrating the computer software's functions during the Auto Focusing procedure.

Alternatively, the engineer can automatically focus the LD assembly by clicking the A.Focus button. This activates the auto focusing procedure described below and in the flow chart illustrated in FIG. 17. If during this iterative process, the pre-curing beam width tolerances cannot be met, the message box would display the Large Beam error message.

To automate the focusing of LD assemblies a new parameter, Focus Error, is introduced. Focus Error is defined as follows:

$$\text{Focus Error} = (d_n - D_n)W_n + (d_m - D_m)W_n + (d_f - D_f)W_f$$

where $d_n, d_m, d_f$=beam width readings in the near, mid and far-fields respectively.

$D_n, D_m, D_f$=Nominal beam width values in the near, mid and far-fields respectively.

$W_n, W_m, W_f$=Weighting factors assigned to the near, mid and far-field respectively.

For example, with a typical LD assembly used in standard bar-code scanners, $W_n=0, W_m=1, W_f=0$ because the mid field beam width is regarded as the most important. So, the Focusing Error reduces to $$\text{Focusing Error (MultiBit)} = (d_m - D_m)W_m$$

The deviation of the beam width values from the nominal values and the Optimization Function (OF) are calculated as before:

$$\text{Deviation} = \{[(d_n-D_n)W_n]^2 + [(d_m-D_m)W_m]^2 + [(d_f-D_f)W_f]^2\}^{1/2}$$

$$\text{Optimization Function } (OF) = (1 - \text{Deviation}/\text{Deviation}_{max})*100\%$$

where $\text{Deviation}_{max}$ is the maximum possible deviation obtained experimentally for each LD model.

The automatic focusing algorithm includes several steps, each with a specific focusing target. Following are the detailed descriptions of each step.

1. Move the focusing lens so that the beam width in the near-field scan head approaches the maximum pre-curing value (Focusing target: |Beamwidth$_{near}$-Max. Beamwidth$_{near}$|<=±5 μm). This is to ensure that the beam has a good starting beam width. It is necessary because the variations of LD assemblies prevent the pre-focusing process from being accurate. If this step is not included, occasional overshoot of the lens position would cause the feedback control loop to be unstable.
2. Adjust focusing so that the value of Focusing Error approaches zero (Focusing target: |Focus Error|<=±2 μm).
3. Check the beam widths in the near- and far-fields against their corresponding pre-curing tolerance limits. Depending on the result, the following actions are taken.
    a) If both are within limits, a message of "Focusing Successful!" is displayed and focusing is done.
    b) If both are out of limits, the laser cannot be focused to specified tolerance and should be rejected. A message of "Large Beam!" is displayed in this case.
    c) If the beam is within limit in the near-field but out of limit in the far-field, the lens is readjusted with a focusing target of (-6 <=Beamwidth$_{near}$-Max. Beamwidth$_{near}$<=-2 μm). Once this is done, the beam width at far-field is checked again. If the beam width at far-field is within tolerance, the "Focusing Successful!" message is displayed and the assembly is accepted. If the beam width at far-field is out of tolerance, the "Large Beam!" message is displayed and the assembly is rejected.

d) If the beam is within limit in the far-field but out of limit in the near-field, the lens is readjusted with a focusing target of (−6 <=Beamwidth$_{far}$−Max. Beamwidth$_{far}$<=−2 μm). Once this is done, the beam width in the near-field is checked again. If the beam width in the near-field is within tolerance, the "Focusing Successful!" message is displayed and the assembly is accepted. If the beam width in the near-field is out of tolerance, the "Large Beam!" message is displayed and the assembly is rejected.

Curing

Figure 18:
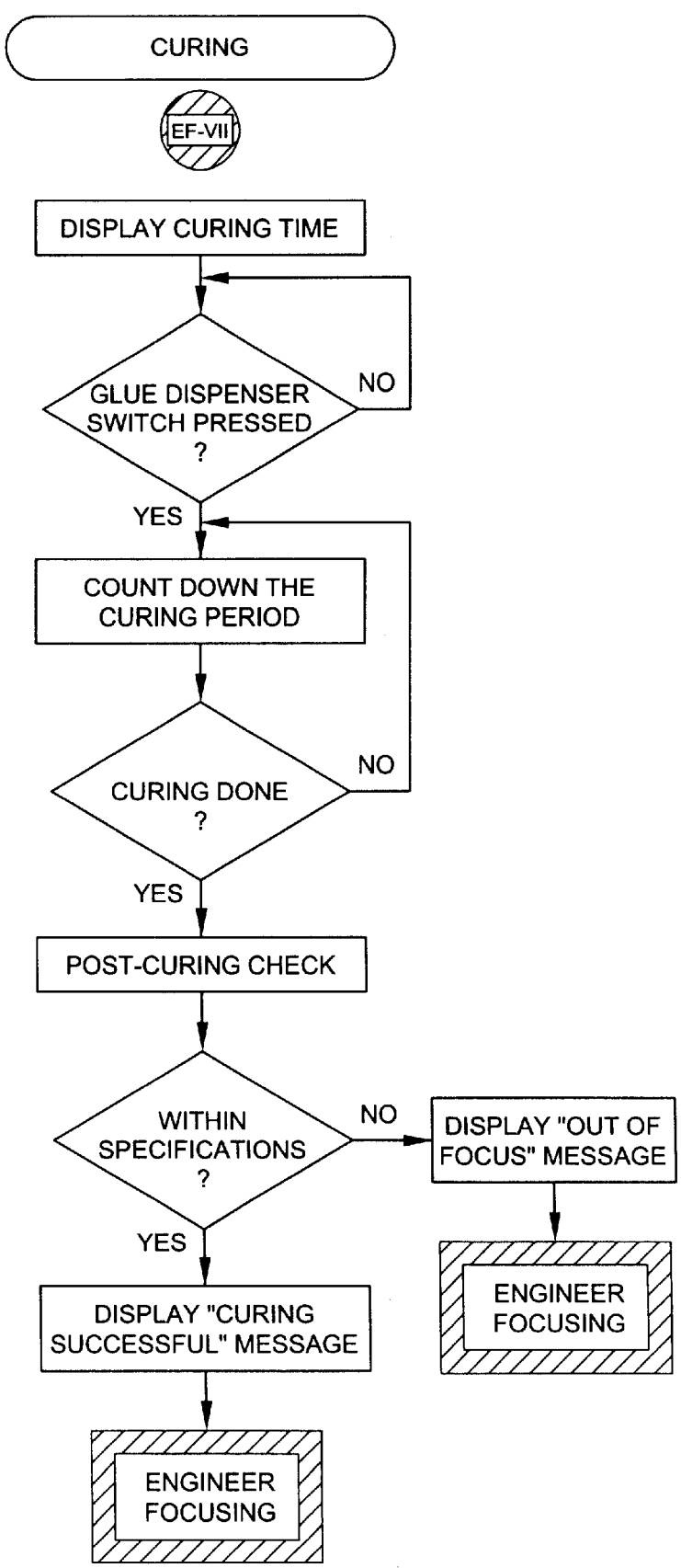
FIG. 18 is a flowchart illustrating the computer software's functions during the Curing procedure.

Once the lens is focused, the engineer can semi-automatically glue the LD assembly by clicking on the curing button. The engineer will then manually position the glue dispenser above the notch of the LD assembly and push the trigger switch on the dispenser gun. This initiates the curing timer to count down and at the end of the curing period, the software checks whether the beam widths are within the post-curing beam width tolerances as shown in the Flow Chart of FIG. 18. If they are, a Curing Successful message is displayed, otherwise, an Out of Focus message is displayed.

At any point during the focusing and assembly process, the engineer can save process data by clicking on the Save menu icon or the Save As menu item. Clicking the Save menu icon or Save As menu item brings up a window that includes a list box for changing the path of the data file, a combo box for changing the drive, a text box for input of the file name, an OK and a Cancel button. Clicking the OK button saves the process data to the data file and clicking the Cancel button cancels the save operation.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. An apparatus for positioning a light beam modifier relative to a light beam source to optimize a beam characteristic at one or more desired locations along the path of a beam comprising:

a light source for emitting a first light beam along a first beam path;

a first light beam analyzer positioned at a first desired location along said first beam path for continuously measuring a characteristic of said first light beam emitted from said light source and generating a value signal based on said measurement;

a first light beam modifier axially aligned along said first beam path between said light beam source and said first light beam analyzer, said first light beam modifier being movable along said first beam path relative to said light source; and a host computer electrically connected to said first light beam analyzer and said first light beam modifier, said host computer receiving said value signal and generating a focusing signal for axially adjusting said first light beam modifier along said beam path to provide an optimal beam characteristic at said first location.

2. The apparatus as defined in claim 1, wherein said light beam modifier is an optical focusing lens.

3. The apparatus as defined in claim 1, wherein said light source is a laser emitting diode.

4. The apparatus as defined in claim 1, wherein said measured beam characteristic is a beam width.

5. The apparatus as defined in claim 1, further comprising a first focusing fixture for holding said light source and said light beam modifier in axial alignment, said focusing fixture being adjustable to point said first light beam emitted from said light source at said first light beam analyzer.

6. The apparatus as defined in claim 5, wherein said first focusing fixture includes a first focusing motor electrically connected to said host computer for axially adjusting said light beam modifier along said beam path.

7. The apparatus as defined in claim 6, wherein said host computer generates said focusing signal based on a difference between said value signal and a predetermined parameter range associated with said first location, said focusing signal activating said focusing motor to axially adjust said light beam modifier with respect to said light source, said focusing signal terminating when said value signal falls within said predetermined parameter range.

8. The apparatus as defined in claim 6, wherein said first focusing fixture includes a drive member for holding said light beam modifier, said drive member being driven by said first focusing motor for axially adjusting said light beam modifier along said beam path.

9. The apparatus as defined in claim 1, further comprising a first carrier rail axially aligned with said first beam path and wherein said first light beam analyzer is slidably mounted to said first carrier rail for positioning and fixing said first light beam analyzer at said first desired location.

10. The apparatus as defined in claim 1, further comprising:

a first beam splitter positioned along the axis of said first beam path between said light beam modifier and said first light beam analyzer, said first beam splitter splitting said first light beam into a first component and a second component, a characteristic of said first component being continuously measured by said first light beam analyzer; and a second light beam analyzer electrically connected to said host computer and positioned at a second desired location along a path of said second component for continuously measuring a characteristic of said second component and generating a value signal based on said measurement, wherein said host computer receives said value signals from said first and second light beam analyzers and generates a focusing signal based on differences between said value signals and respective predetermined parameter ranges associated with said first and second locations to provide optimal beam characteristics at said first and second locations.

11. The apparatus as defined in claim 10, further comprising:

a first carrier rail axially aligned with said first component of said light beam; and a second carrier rail axially aligned with said second component of said light beam, wherein said first light beam analyzer is slidably mounted to said first carrier rail for positioning and fixing said first light beam analyzer at said first desired location and said second light beam analyzer is slidably mounted to said second carrier rail for positioning and fixing said second light beam analyzer at said second desired location.

12. The apparatus as defined in claim 10, further comprising:

a second beam splitter positioned along said path of said second component of said light beam between said first beam splitter and said second light beam analyzer, said second beam splitter splitting from said second component a third component of said light beam; and a third light beam analyzer electrically connected to said host computer and positioned at a third desired location along a path of said third component for continuously measuring a characteristic of said third component of said light beam and generating a value signal based on said measurement, wherein said host computer receives said value signals from said first, second and third light beam analyzers and generates a focusing signal based on differences between said value signals and respective predetermined parameter ranges associated with said first, second and third locations to provide optimal beam characteristics at said first, second and third locations.

13. The apparatus as defined in claim 12, further comprising:

a first carrier rail axially aligned with said first component of said light beam;

a second carrier rail axially aligned with said second component of said light beam; and, a carrier slidably mounted to said second carrier rail, wherein said first light beam analyzer is slidably mounted to said first carrier rail for positioning and fixing said first light beam analyzer at said first desired location and said second light beam analyzer is slidably mounted to said second carrier rail for positioning and fixing said second light beam analyzer at said second desired location and said third light beam analyzer and said second beam splitter are fixed on said carrier for positioning and fixing said third light beam analyzer at said third desired location.

14. The apparatus as defined in claim 1, further comprising:

a second light source positioned for emitting a second light beam along a second beam path;

a first beam splitter positioned along the axes of said first and second beam paths between said first light beam modifier and said first light beam analyzer, said first beam splitter splitting each of said first and second light beams into first and second components, a characteristic of said first components being continuously measured by said first light beam analyzer; and a second light beam modifier electrically connected to said host computer and axially aligned along said second beam path between said second light source and said first beam splitter, said second light beam modifier being movable along said second beam path relative to said second light source;

wherein said first light beam analyzer generates value signals based on said measurements of said first components and wherein said host computer receives said value signals and generates focusing signals for axially adjusting said first and second light beam modifiers.

15. The apparatus as defined in claim 14, further comprising:

a second light beam analyzer electrically connected to said host computer and positioned at a second desired location along a path of said second components for continuously measuring a characteristic of said second components and generating value signals based on said measurement, wherein said host computer receives said value signals from said first and second light beam analyzers and generates focusing signals based on differences between said value signals and respective predetermined parameter ranges associated with said first and second locations for axially adjusting said first and second light beam modifiers.

16. The apparatus as defined in claim 14, further comprising a second focusing fixture for holding said second light source and said second light beam modifier in axial alignment, said second focusing fixture being adjustable to point said second light beam at said first beam splitter.

17. The apparatus as defined in claim 16, wherein said second focusing fixture includes a second focusing motor electrically connected to said host computer for axially adjusting said second light beam modifier along said second beam path.

18. The apparatus as defined in claim 15, further comprising:

a second beam splitter positioned along the axes of said second components of said light beams between said first beam splitter and said second light beam analyzer, said second beam splitter splitting from each of said second components a third component; and a third light beam analyzer electrically connected to said host computer and positioned at a third desired location along a path of said third components of said light beams for continuously measuring a characteristic of said third components and generating value signals based on said measurement, wherein said host computer receives said value signals from said first, second and third light beam analyzers and generates focusing signals based on differences between said value signals and respective predetermined parameter ranges associated with said first, second and third locations for axially adjusting said first and second light beam modifiers.

19. The apparatus as defined in claim 1, further comprising:

a video camera electrically connected to said host computer and positioned adjacent said first light beam analyzer for capturing an image of said light beam falling on said first beam light analyzer; and wherein said host computer includes a video monitor for displaying the image captured by said video camera.

20. The apparatus as defined in claim 19, wherein said host computer digitizes the image captured by the video camera and displays the digitized image on said video monitor.

21. The apparatus as defined in claim 20, wherein said host computer further provides a reference target and displays said reference target along with said digitized image on said video monitor for visually assisting an operator in pointing the light source beam.

22. The apparatus as defined in claim 5, further comprising:

an adjustment motor electrically connected to said host computer and positioned adjacent said first focusing fixture for adjusting the direction of said light beam; and a video camera electrically connected to said host computer and positioned adjacent said first light beam analyzer for capturing an image of said light beam falling on said first light beam analyzer, wherein said host computer includes a frame grabber for digitizing the image captured by the video camera and for detecting the location of said light beam on said first light beam analyzer and an algorithm for generating an adjustment signal based on the difference between the detected light beam location and a predetermined location, said adjustment signal activating said adjustment motor to adjust the direction of said light beam, said adjustment signal terminating when the detected light beam location is within the predetermined location.

23. The apparatus as defined in claim 1, further comprising a light source power circuit electrically connected to said host computer and said light source for providing controlled power to said light source.

24. The apparatus as defined in claim 23, wherein said light source power circuit comprises a current monitoring circuit operatively coupled to said light source for monitoring a current flowing through said light source and generating an output signal corresponding to said monitored current, and a power control circuit operatively coupled to said light source for controlling power to said light source in response to said output signal.

25. The apparatus as defined in claim 6, wherein said first focusing motor includes an optical limit switch which prevents axial adjustment of said light beam modifier beyond a predetermined distance by terminating power to said motor when said predetermined distance is exceeded.

26. The apparatus as defined in claim 1, further comprising a glue dispenser electrically connected to said host computer for dispensing glue to said light beam modifier and said light source when said focusing signal from said host computer terminates.

27. The apparatus as defined in claim 26, wherein said glue dispenser includes a valve electrically connected to said host computer, said valve being controlled by said host computer to dispense a predetermined amount of glue.

28. The apparatus as defined in claim 27, wherein said glue dispenser generates a curing signal when the glue is dispensed, said host computer receiving said curing signal and initiating a timer, said timer alerting an operator when the glue has cured.

29. A method for optimizing a characteristic of a light beam emitted from a light source at one or more desired locations along the path of said light beam, said method comprising the steps of:

positioning a light beam modifier along said light beam path in axial alignment with said beam at a distance from said light beam source for optimizing a characteristic of said beam;

continuously measuring a characteristic of said light beam at at least one selected position along said beam path;

generating value signals corresponding to said continuously measured characteristic;

comparing said value signals with a predetermined value range corresponding to an optimal beam characteristic;

generating a focusing signal which corresponds to an adjustment of said modifier to optimize said beam characteristic at said selected position;

sending said focusing signal to said modifier;

axially adjusting said light beam modifier along said beam path based on said focusing signal; and terminating said focusing signal when said value signals fall within said predetermined value range.

30. The method as defined in claim 29, wherein said light beam modifier is an optical focusing lens.

31. The method as defined in claim 29, wherein said light source is a laser emitting diode.

32. The method as defined in claim 29, wherein said measured beam characteristic is a beam width.

33. The method as defined in claim 29, further comprising the step of fixing said light beam modifier with respect to said light source when said focusing signal terminates.

34. The method as defined in claim 29, further comprising the steps of:

positioning at least one beam splitter along the axis of said beam path for splitting from said light beam one or more components; and continuously measuring a characteristic of said one or more components at a selected position along the path of said components;

generating value signals corresponding to said continuously measured characteristics of said components; and comparing said value signals with a predetermined value range corresponding to an optimal beam characteristic.

35. The method as defined in claim 29, further comprising the steps of:

displaying a video image of said light beam along with a reference target corresponding to said at least one selected measurement position along said beam path; and adjusting said light beam path based on said displayed video image and said reference target.

* * * * *